United States Patent [19]
Li et al.

[11] Patent Number: 5,557,731
[45] Date of Patent: Sep. 17, 1996

[54] METHOD AND SYSTEM FOR DETECTING UNDEFINED OBJECTS IN AN APPLICATION

[75] Inventors: Shih-Gong Li; John S. Wang, both of Austin, Tex.

[73] Assignee: International Business Machines Corporation, Armonk, N.Y.

[21] Appl. No.: 174,549

[22] Filed: Dec. 28, 1993

[51] Int. Cl.⁶ ....................................................... G06F 3/14
[52] U.S. Cl. ........................................... 395/161; 395/155
[58] Field of Search ..................................... 395/155, 161, 395/600, 700, 50, 160, 155, 500

[56] References Cited

U.S. PATENT DOCUMENTS

| | | | |
|---|---|---|---|
| 5,379,432 | 1/1995 | Orton et al. | 395/700 |
| 5,398,336 | 3/1995 | Tantry et al. | 395/600 |
| 5,404,529 | 4/1995 | Chernikoff et al. | 395/700 |
| 5,412,756 | 5/1995 | Bauman et al. | 395/50 |

OTHER PUBLICATIONS

Tomasz Imielinki, Shamim Nagvi, and Kumar Vadaparty, "Incomplete Objects—A Data Model for Design and Planning applications", Jul. 1990, pp. 288–297.

Xiaolei Quian, Richard Jullig, and Marilyn Daum, "Consistency Management In a Project Management Assistant", Aug. 30, 1990, pp. 34–43.

Roberto Zicari and GIP Altair, "Incomplete Information in Object–Oriented Databases", Jul. 1990, pp. 459–471.

Katsumi Tanaka, Masatoshi Yoshikawa, and Kozo Ishihara, "Schema Design, Views and Incomplete Information in Object–Oriented Databases", 1989, pp. 239–250.

S, Clerici and F. Orejas, "GSBL: An Algebraic Specification Language Based on Inheritance", Aug. 1988, pp. 78–92.

Catherine Granger, "An Application of Possibility Theory To Object Recognition", Dec. 1988, pp. 351–362.

Hidehio Tanaka, "Permeation of Knowledge Information Processing Systems", 1990, pp. 1–3.

*Primary Examiner*—Mark R. Powell
*Assistant Examiner*—Ruay Lian Ho
*Attorney, Agent, or Firm*—Mark S. Walker; Duke W. Yee; Andrew J. Dillon

[57] ABSTRACT

The present invention provides a method and system for permitting a user to efficiently create an application utilizing a plurality of objects in a graphic user interface. A database is created to track objects selected by a user. The objects selected by a user for utilization in the application are registered in the database. The user is permitted to create definitions for the selected objects. An absence of a definition for one of the selected objects within the database is graphically indicated, wherein the user may efficiently identify objects requiring a definition.

22 Claims, 23 Drawing Sheets

METHOD AND SYSTEM FOR DETECTING UNDEFINED OBJECTS IN AN APPLICATION

BACKGROUND OF THE INVENTION

1. Technical Field

The present invention relates in general to an improved method and system for developing an application and in particular to a method and system for tracking objects in a application under development. Still more particularly, the present invention relates to a method and system for detecting undefined objects in an application under development in a data processing system.

2. Description of the Related Art

Today, many programmers and application designers utilize application builders to develop a complex application. An application builder is a program that allows a user to develop a complex application. Typically, in a graphic user interface (GUI), the application builder provides a GUI interface to the user for creating an application. The user may select various objects, such as a window, text field, buttons, or sliders, for use in the application being developed. The user may "drag and drop" objects into the desired locations for the application under development.

Various objects are available for use by the user. Objects requiring actions are referred to as "source" or "action" objects and include application specific objects defined by the user and predefined system objects, such as pop-up menus, scroll bars, sliders, push buttons, and menu bars with pull down menus for further selections. Actions on a source object may generate another object, which is the target object. A target object may become a source object that is associated with some further actions.

For example, a menu bar may generate several pull down menus, and each pull down menu item selection may generate a sequence of pop-up menus. Each generated pop-up menu may contain buttons such as okay, cancel, and help. Each button may generate additional pop-up menus.

Typically, users work on multiple objects within the application under development simultaneously and as additional objects are added, it becomes more difficult for a user to insure that every source object is associated with its target objects by the required actions. Currently, users must mentally remember what objects requiring a connection remain unconnected. In such a situation, the user may leave objects with incomplete definitions, specially lacking an association or connection with target objects for carrying out necessary actions.

Therefore, it would be desirable to have a method and system for increasing the efficiency of application building by reducing the need for the user to track undefined objects.

SUMMARY OF THE INVENTION

It is therefore one object of the present invention to provide an improved method and system for developing an application.

It is another object of the present invention to provide a method and system for tracking objects in an application under development.

It is yet another object of the present invention to provide a method and system for detecting undefined objects in an application and development in a data processing system.

The foregoing objects are achieved as is now described. The present invention provides a method and system for permitting a user to efficiently create an application utilizing a plurality of objects in a graphic user interface. A database is created to track objects selected by a user. The objects selected by a user for utilization in the application are registered in the database. The user is permitted to create definitions for the selected objects. An absence of a definition for one of the selected objects within the database is graphically indicated, wherein the user may efficiently identify objects requiring a definition.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
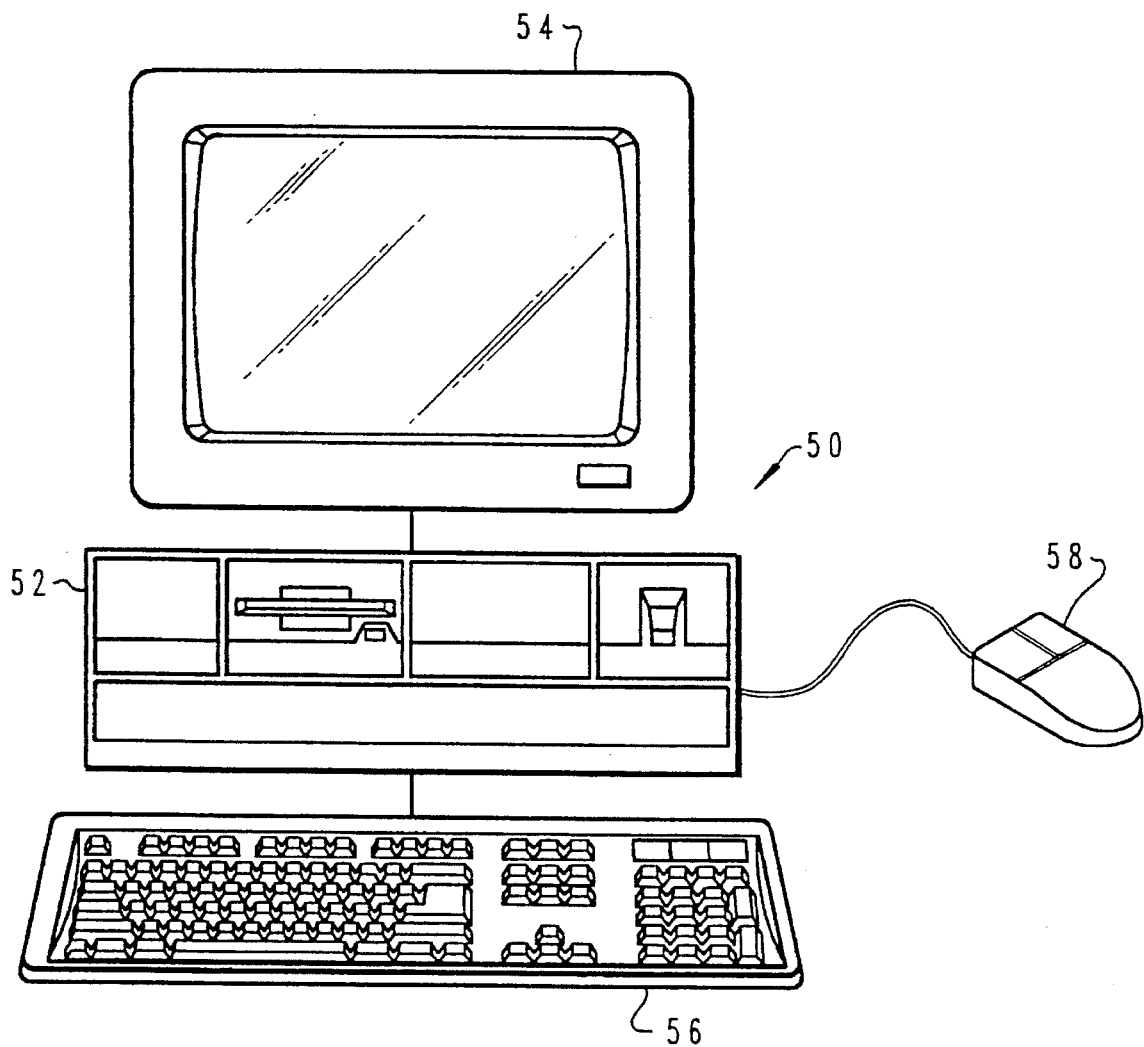
FIG. 1 depicts an illustration of a data processing system in which a preferred embodiment of the present invention may be implemented.

With reference now to the figures and in particular with reference to FIG. 1, a data processing system 10 is depicted in which a preferred embodiment of the present invention may be implemented. Data processing system 10 includes a system unit 2, a video display terminal 4, a keyboard 6, and a mouse 8. Data processing system 10 may be implemented utilizing any suitable computer, such as an IBM PS/2 or IBM RISC SYSTEM/6000 computer, both products of International Business Machines Corporation, located in Armonk, N. Y. "PS/2" and "RISC SYSTEM/6000" are trademarks of International Business Machines Corporation. Although, the depicted embodiment is a personal computer, a preferred embodiment of the present invention may be implemented in other types of data processing systems, such as, for example, intelligent workstations, mini computers, or local area networks.

Figure 2:
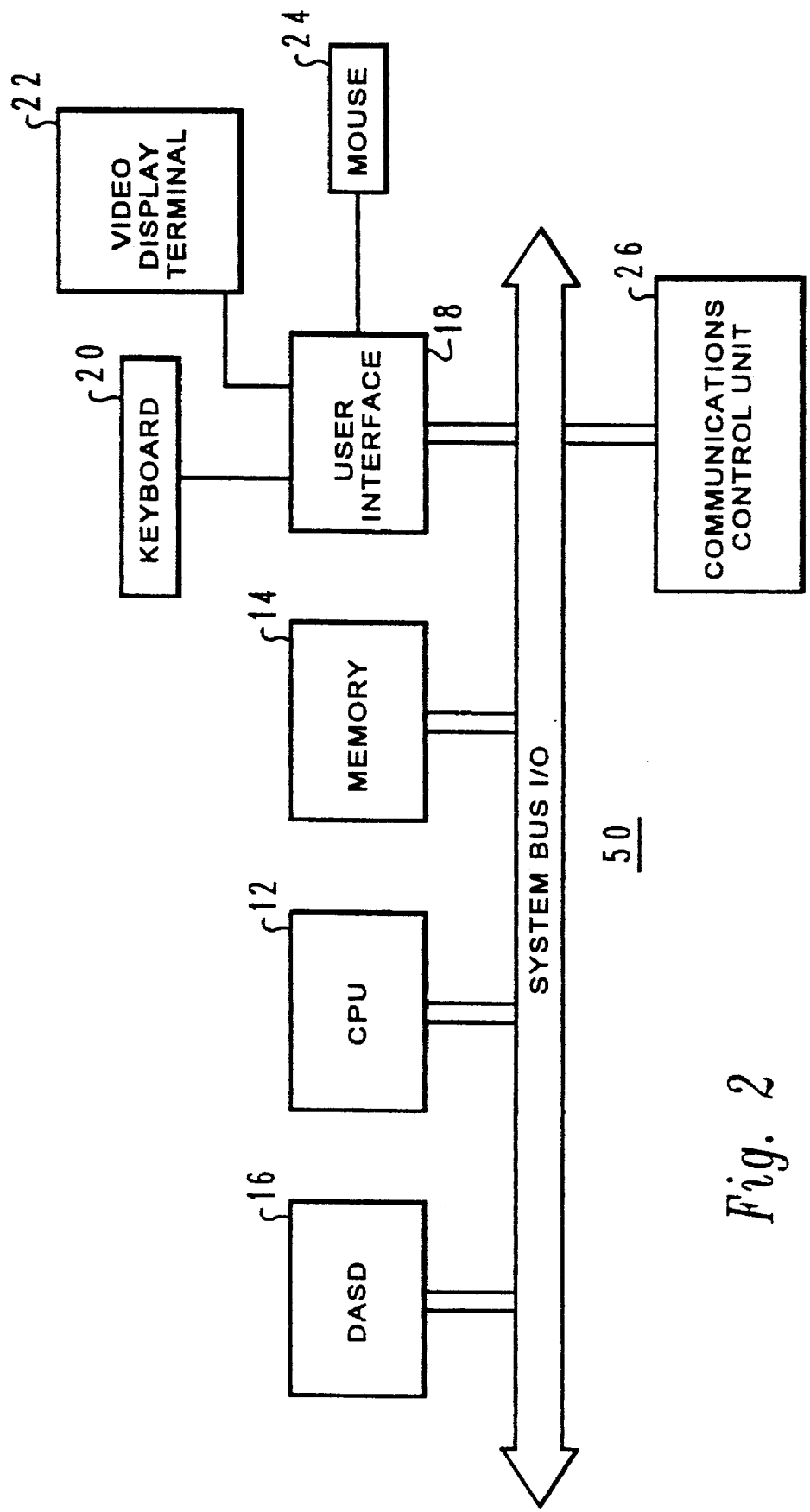
FIG. 2 is a block diagram of the data processing system depicted in FIG. 1.

Referring now to FIG. 2, a block diagram of a data processing system 10 in FIG. 1 is illustrated in accordance with a preferred embodiment of the present invention. System bus 11 provides a connection between various components within data processing system 10. Central processing unit (CPU) 12 provides the decision making capability in data processing system 10. CPU 12 may include one or more processors, such as an 80486 processor or a Pentium processor available from Intel Corporation in Santa Clara, Calif. "Pentium" is a trademark of Intel Corporation.

Memory 14 provides a storage for data processing system 10 and may include both read only memory (ROM) and random access memory (RAM). Direct access storage device (DASD) 16 provides additional storage for data processing system 10. DASD 16 typically provides long term storage for data processing system 10. DASD 16 may include, for example, a hard disk drive or a floppy disk drive.

User interface 18 provides an interface between data processing system 10 and peripherals employed by user to interact with data processing system 10. User interface 18 may include various adapters and drivers for driving peripherals, such as keyboard 20, video display terminal 22, and mouse 24.

Communications unit 26 provides the interface between the data processing system 10 and some other data processing system such as another personal computer or a network.

Figure 3:
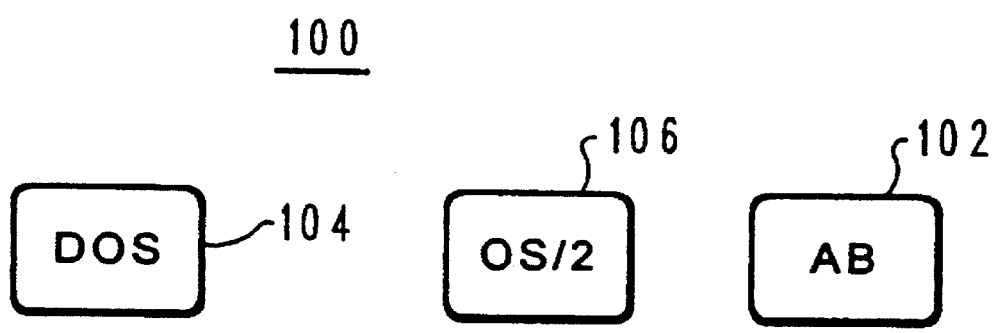
FIGS. 3–15 depict illustrations of the creation of an application using objects from a toolbox in an application builder in accordance with a preferred embodiment of the present invention.

An application builder is utilized to construct applications. Referring to FIG. 3, Desktop 100 contains Application Builder (AB) icon 102, DOS icon 104, and OS/2 icon 106. Desktop 100 may be executing on an AIX or an OS/2 operating system available from International Business Machines Corporation in accordance with a preferred embodiment of the present invention. "AIX" and "OS/2" are registered trademarks of International Business Machines Corporation. DOS icon 104 represents a DOS application in minimized form and OS/2 icon 106 represents an OS/2 application in minimized form. Application Builder icon 102 is a minimized form of an application builder program that a user, such as a program designer, may utilize to develop an application. AIC is an example of an application builder and is available from Visual Edge Software, Ltd.

Figure 4:
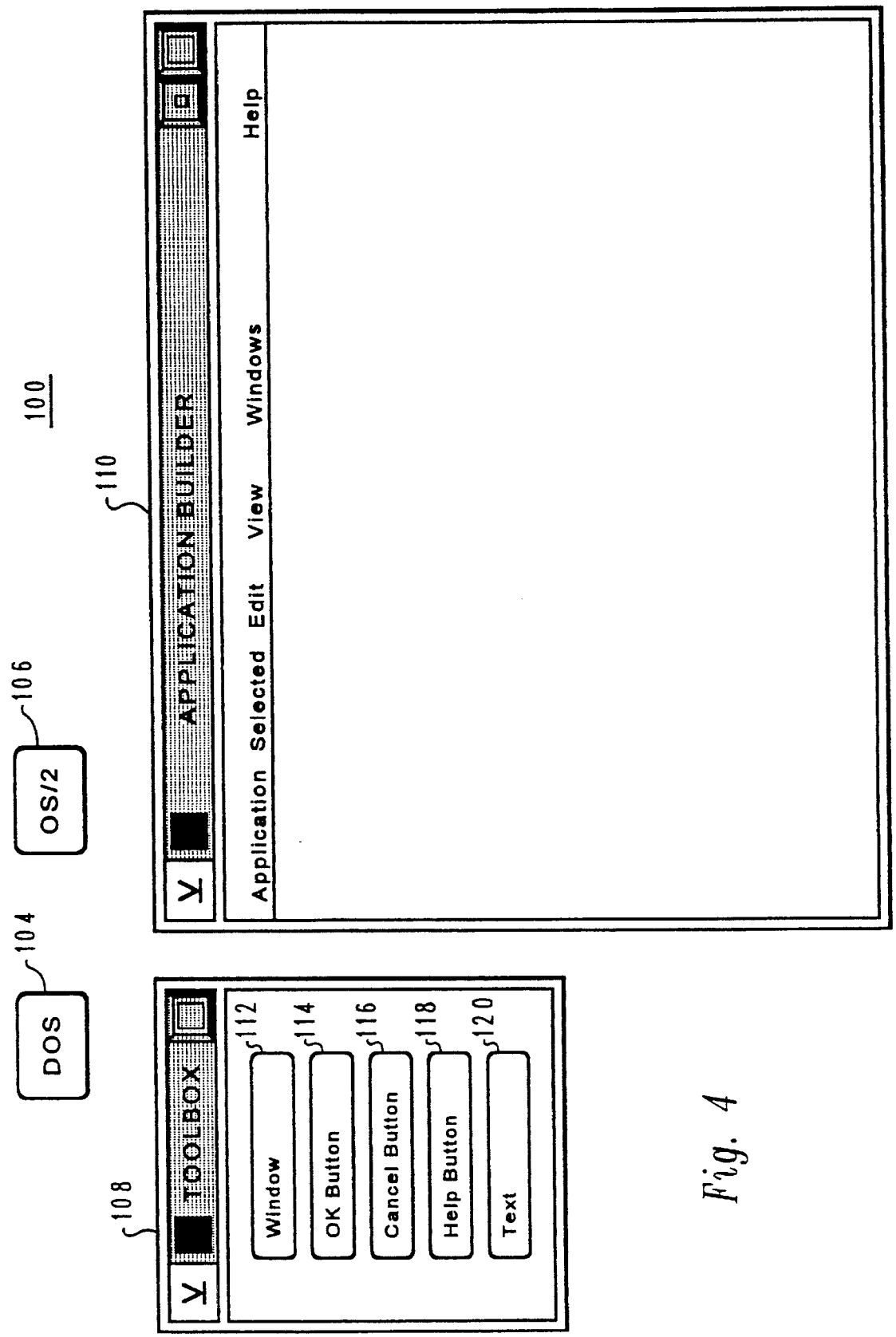
Figure 5:
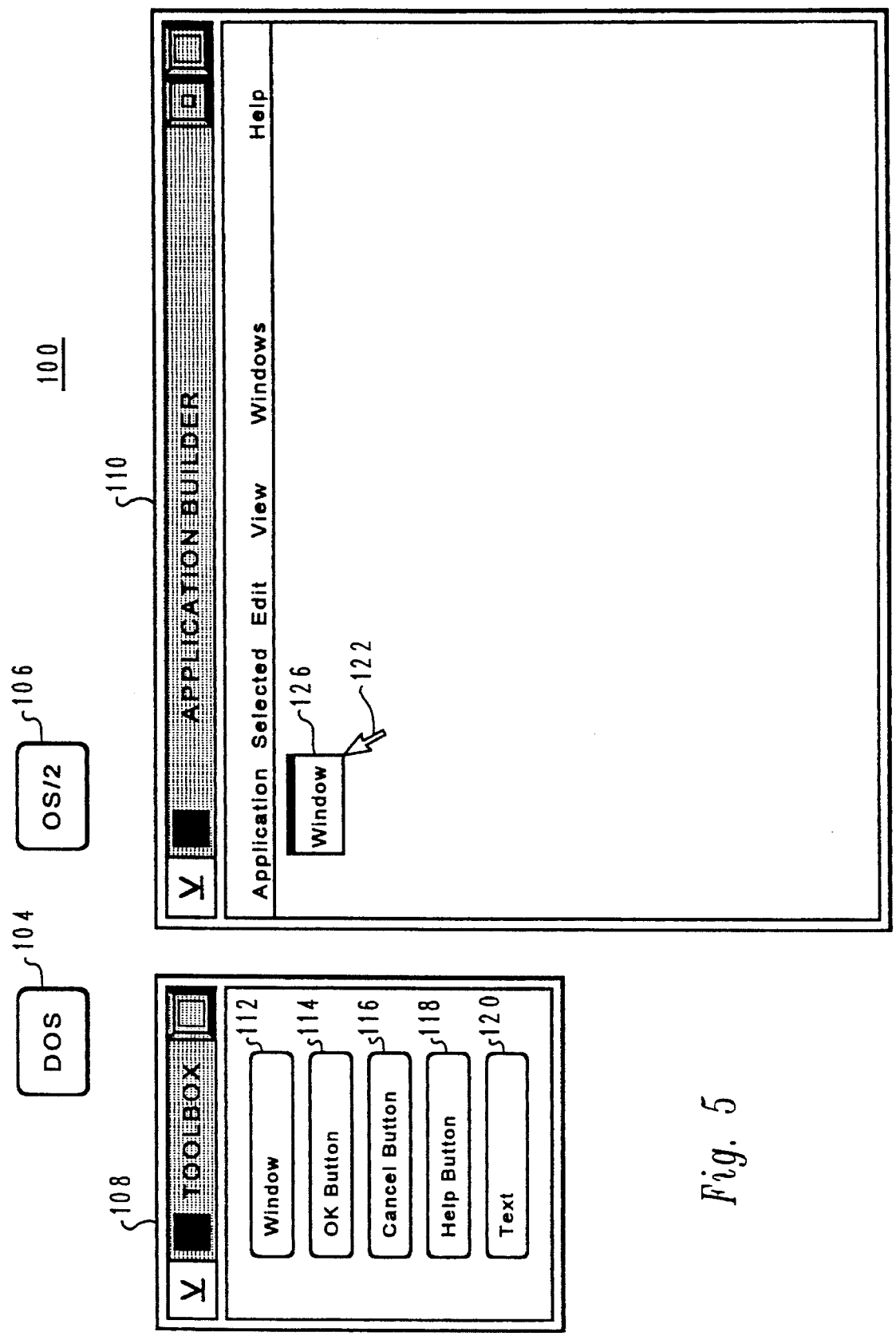

Referring next to FIG. 4, an illustration of a Toolbox Window 108 and an Application Builder Window 110 is depicted. Toolbox Window 108 and Application Builder Window 110 are displayed after Application Builder icon 102 is selected and opened utilizing pointer 122. Pointer 122 is an ionic image controlled by a mouse or other similar devices, and is displayed on the video display of a data processing system to visually indicate to the user icons, menus, or the like that may be selected or manipulated. The term "mouse", when utilized in this document, refers to any type of operating system supported graphical pointing device including, but not limited to: a mouse; trackball; light pen; touch screen; and the like. A pointing device such as a mouse is typically employed by a user of a data processing system to interact with the data processing system's GUI. A "drag and drop" operation typically involves placing a pointer over an object and depressing a mouse button to select the object, moving the object to the desired location, and releasing the mouse button.

Figure 6:
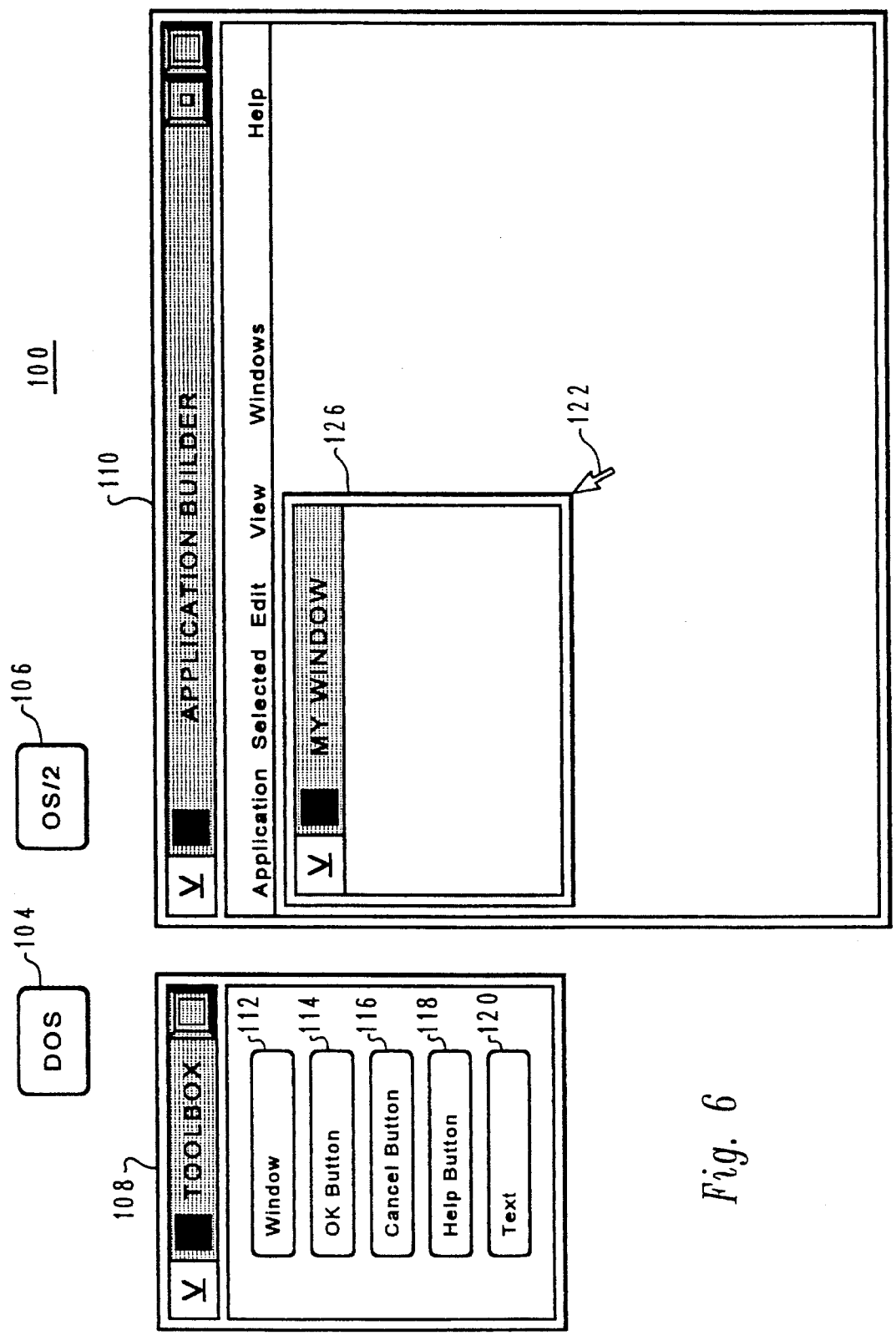

Toolbox Window 108 includes Window 112, Okay button 114, Cancel button 116, Help button 118, and Text field 120. A "drag and drop" operation involving selecting Window 112 with pointer 122 and dragging Window 112 to Application Builder Window 110 and dropping Window 112 on Application Builder Window 110 results in a copy of Window 112, Window 126, being made within Application Builder Window 110. Referring next to FIG. 6, Window 126 has been re-sized and is entitled "My Window".

Figure 7:
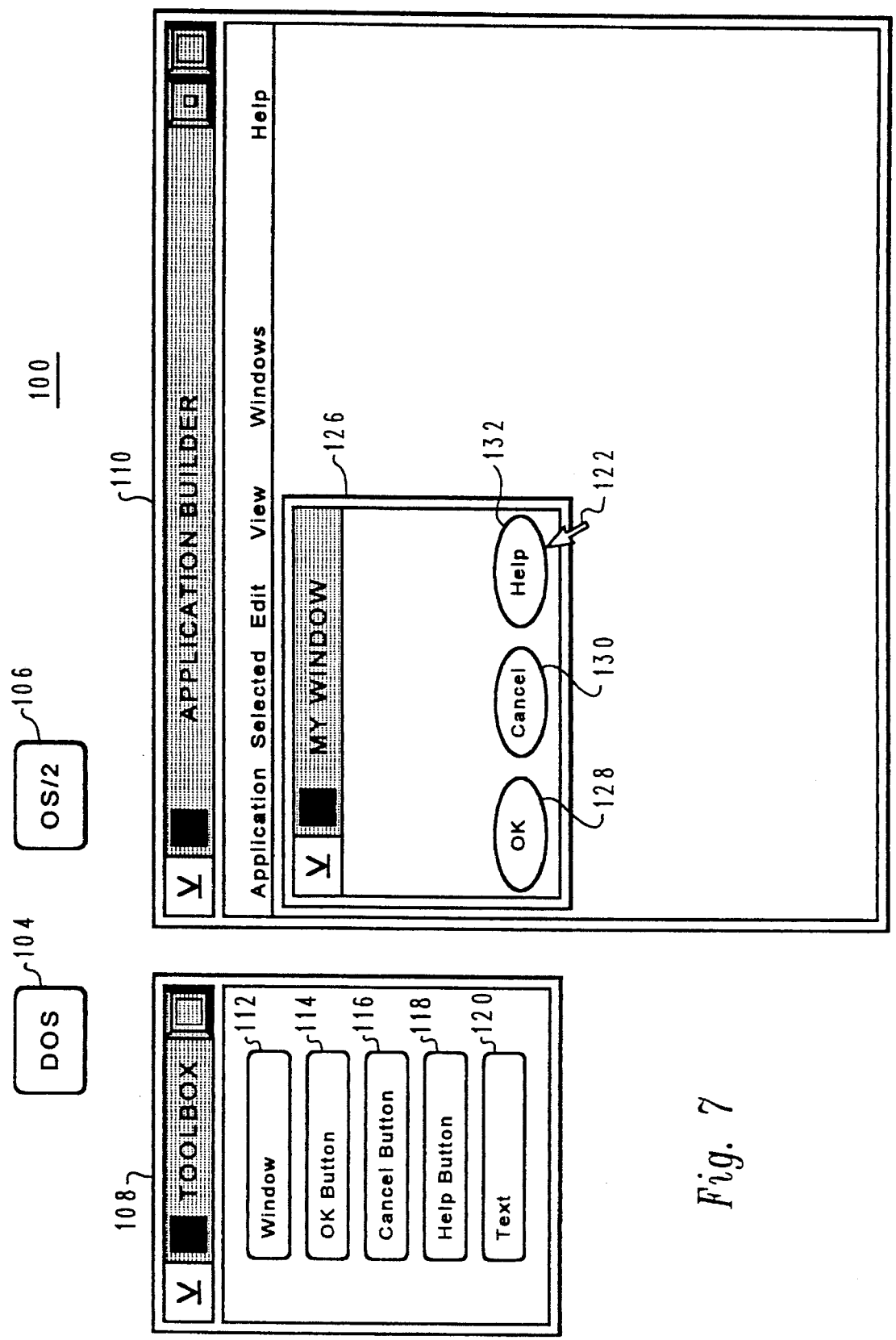

Next, in FIG. 7, Okay button 128, Cancel button 130 and Help button 132 are created within Window 126, by dragging the buttons from Toolbox Window 108 and dropping them in the desired locations within Window 126.

Figure 8:
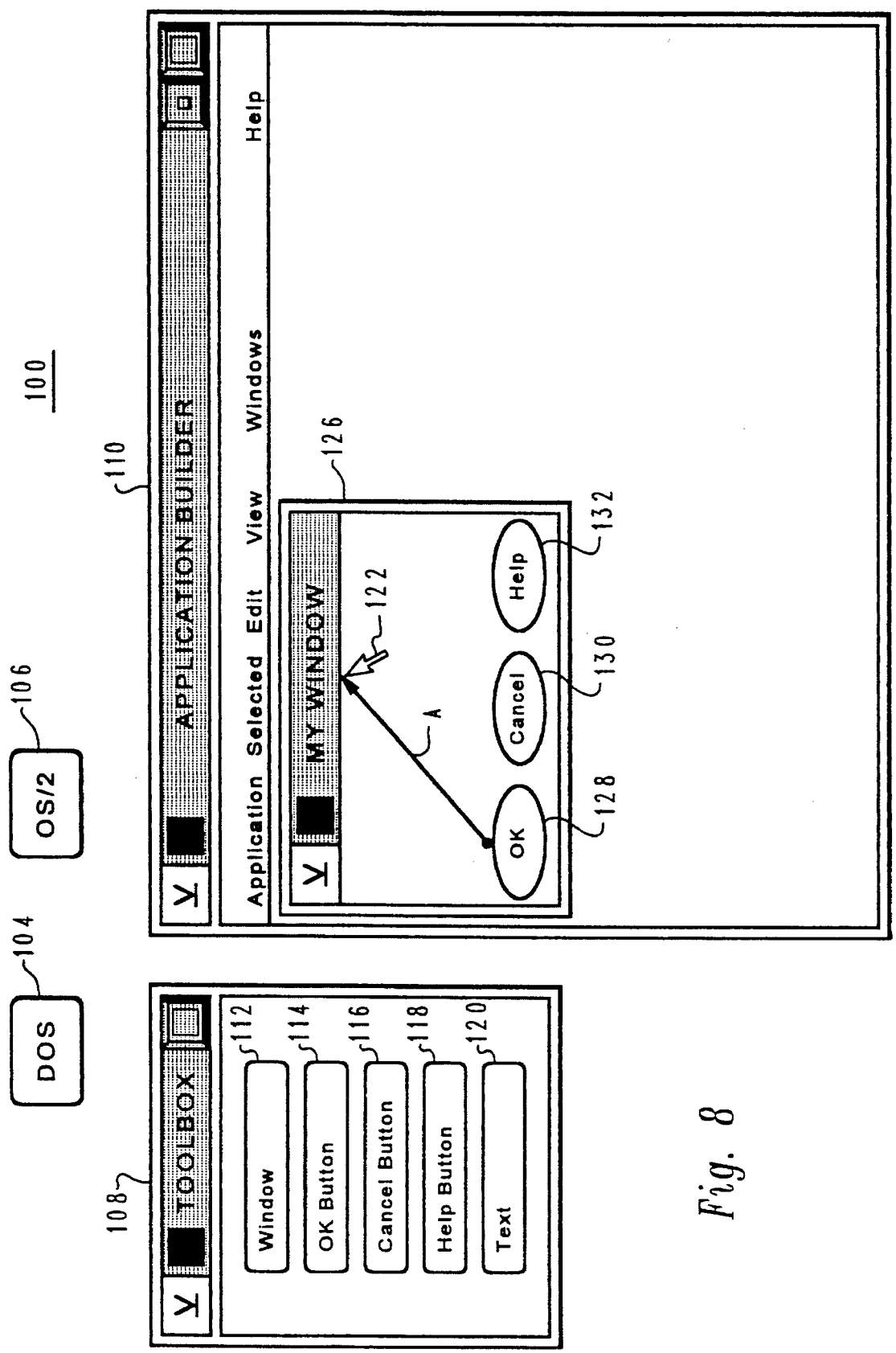
Figure 9:
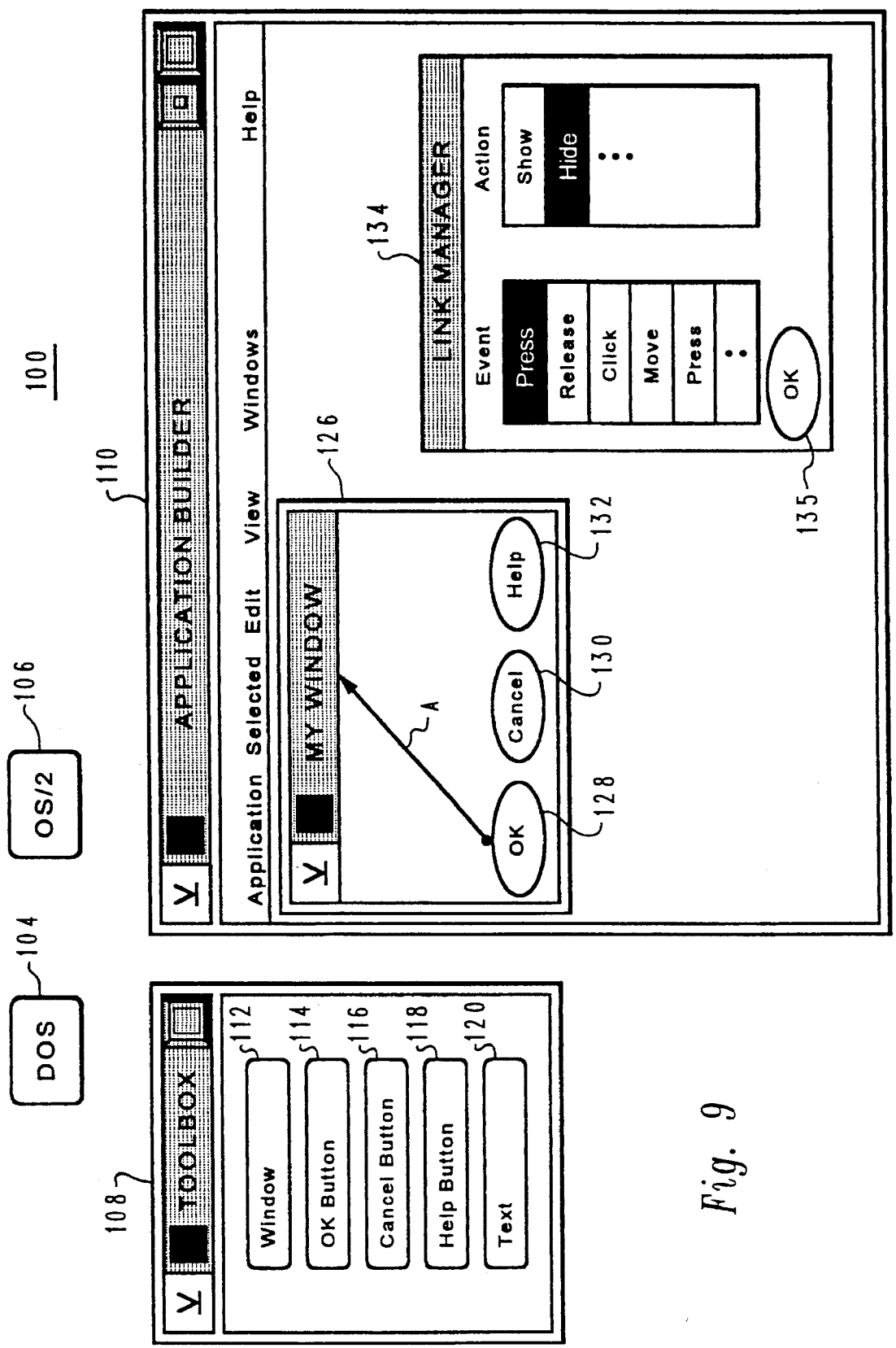

Links may be drawn between a source object and a target object to indicate that whenever a user event occurs, the target object will perform some predefined action. Drawing a link results in a connection being created between the source and target object. Referring to FIG. 8, a link A is created from the source object, Okay button 128, to the target object, Window 126. The user then may select events from Link Manager Window 134 as illustrated in FIG. 9. Link Manager Window 134 includes events that may be selected for the source object and actions that may be selected for the target object. In the depicted example, the event "Press" has been selected for Okay button 128 and the action "Hide" has been selected for My Window (Window 126). By pressing (event) Okay button 135, Link Manager Window 134 is removed (action) from the user's view.

An event receiving object is an object that accepts user input. For example, a push button, such as Okay button 128, is an event receiving object because it handles a user input, such as a mouse button press. On the other hand, a label is not an event receiving object because it does not respond to any user input. All events for an object are registered through Application Builder Window 110, but not all registered events need to have a corresponding action. However, at least one action should be defined.

An "unconnected object", also referred to as an "undefined object", is an event receiving object requiring a target object, but has no target object to handle the response action.

Figure 10:
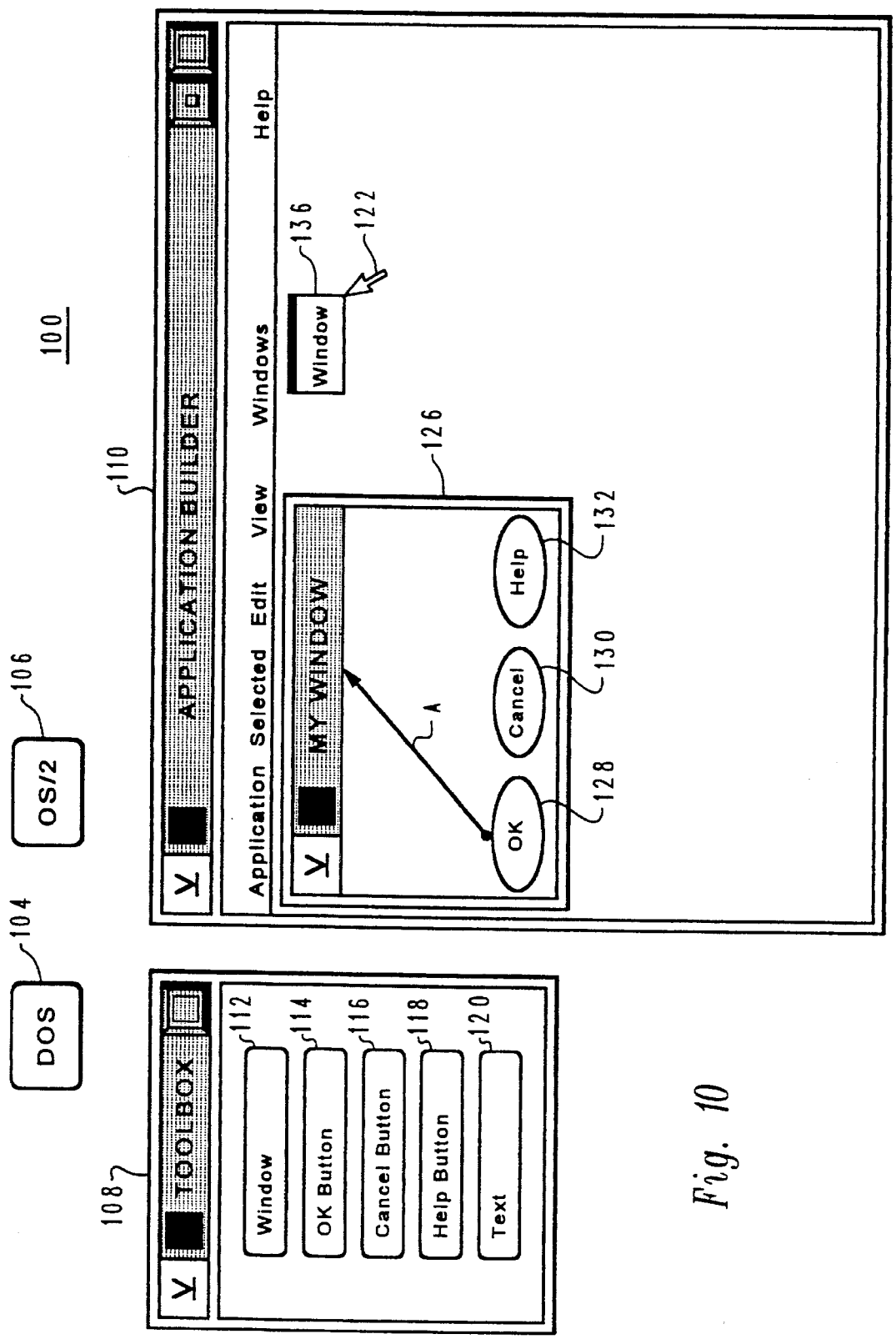
Figure 11:
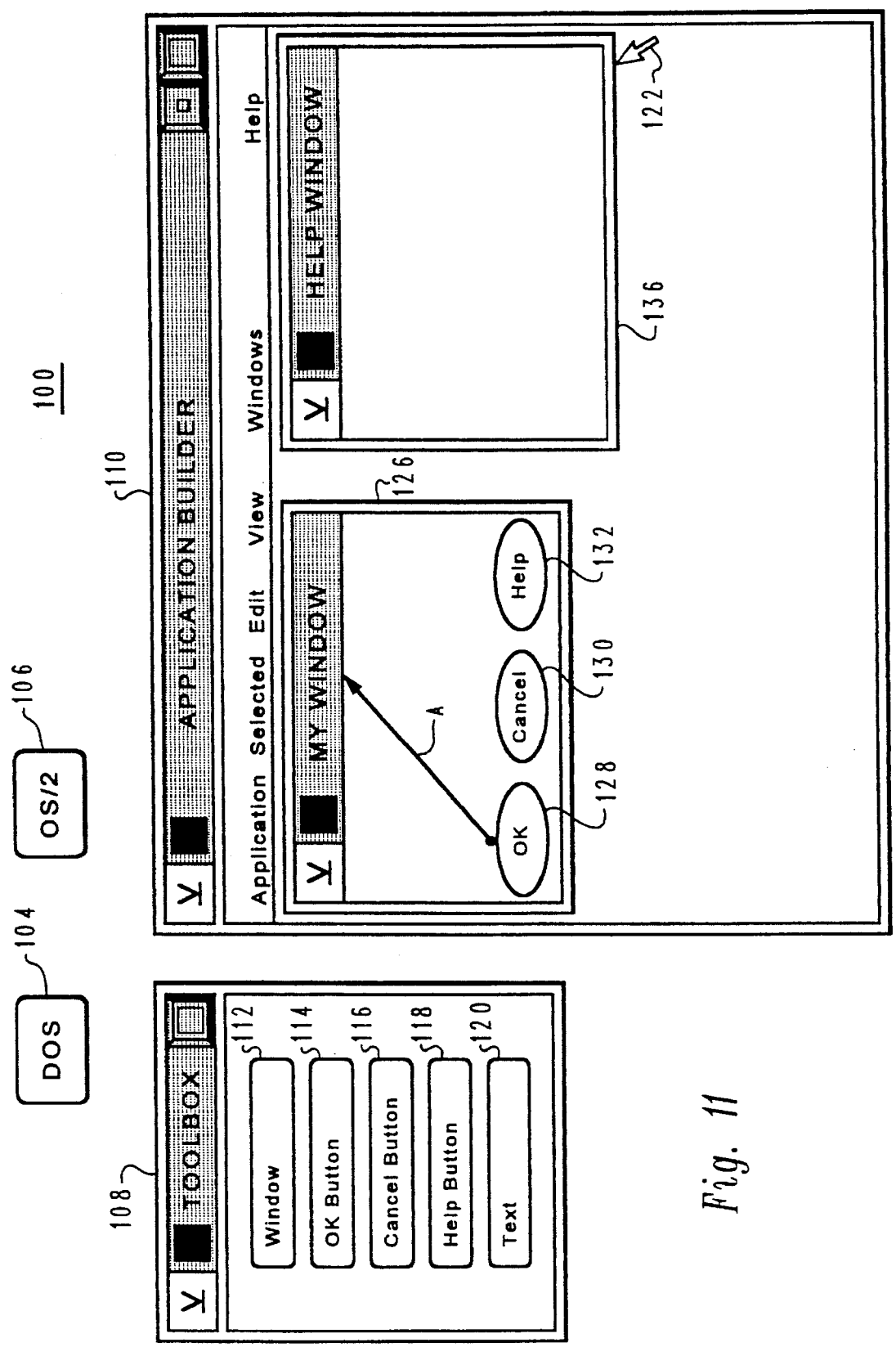
Figure 12:
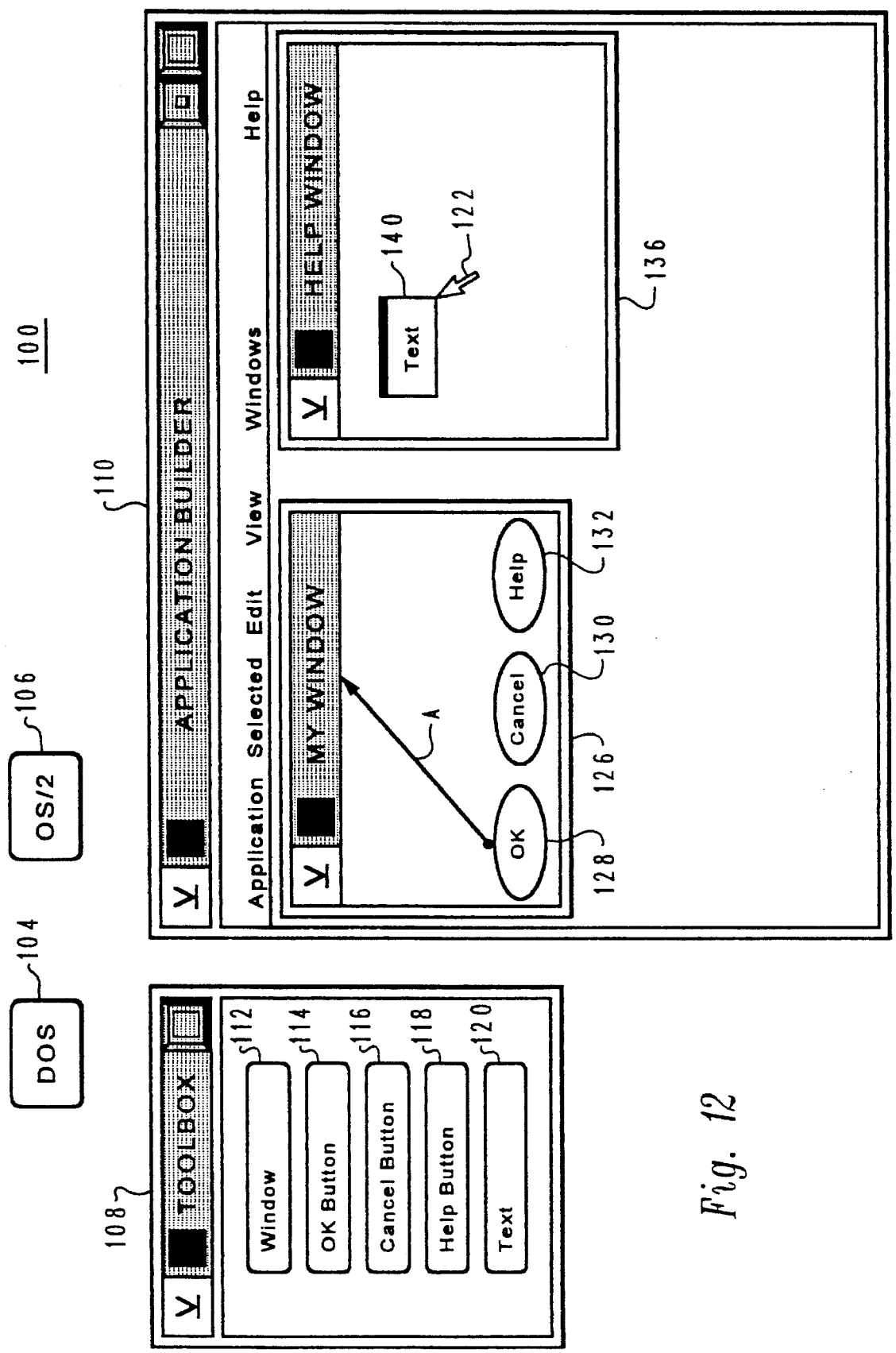
Figure 13:
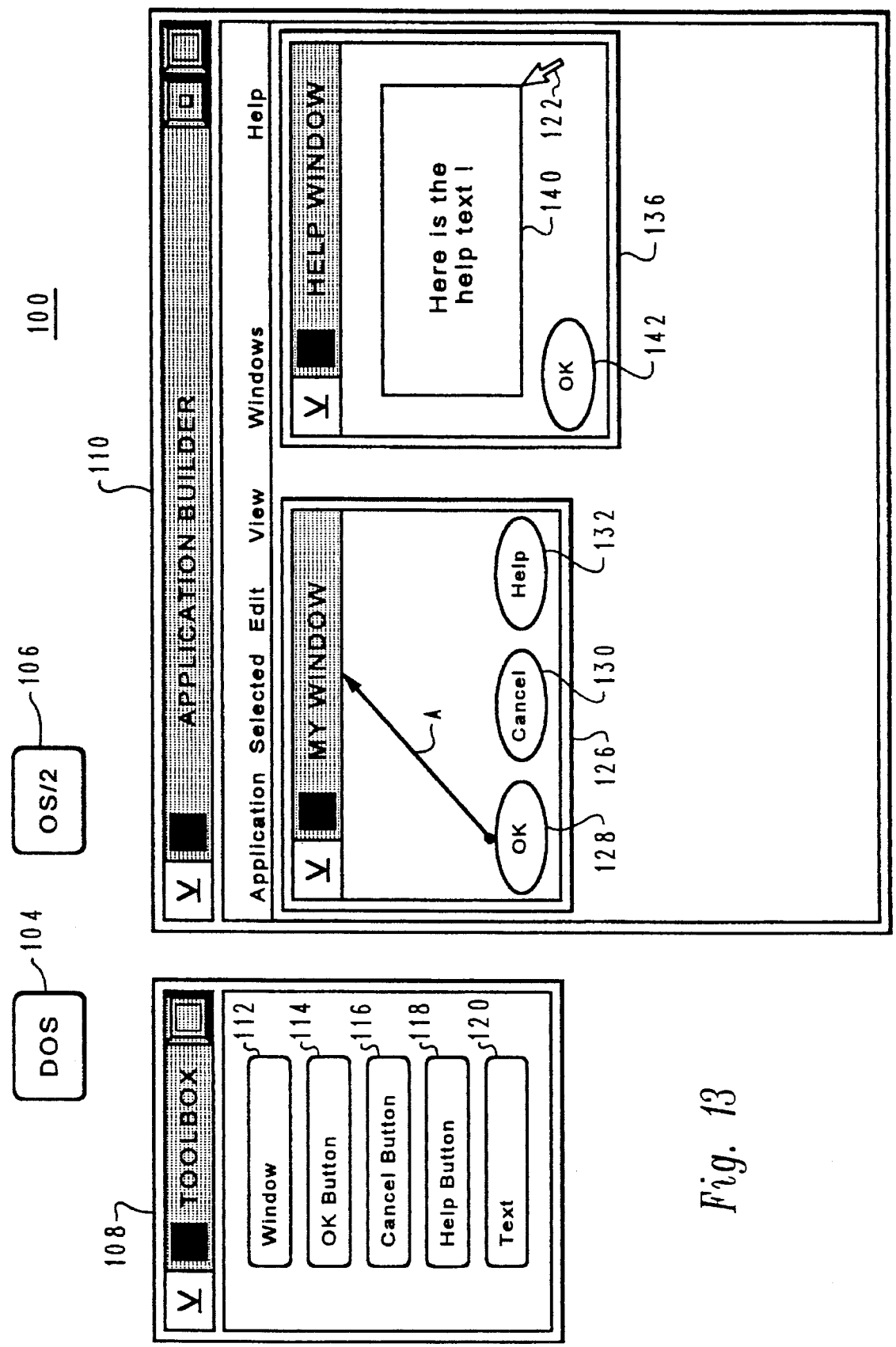

Referring next to FIG. 10, Window 136 has been created in Application Builder Window 110 by dragging Window 112 from Toolbox Window 108 to Application Builder Window 110 and dropping Window 112 into Application Builder Window 110 to create Window 136, which is a copy of Window 112. Referring next to FIG. 11, Window 136 is then re-sized and entitled "Help Window". In FIG. 12, Text field 140 has been created within Window 136. Thereafter, in FIG. 13 Text field 140 is re-sized and the text "Here is the help text!" is placed within Text field 140 in Window 136. In addition, Okay button 142 has been added to Window 136.

Figure 14:
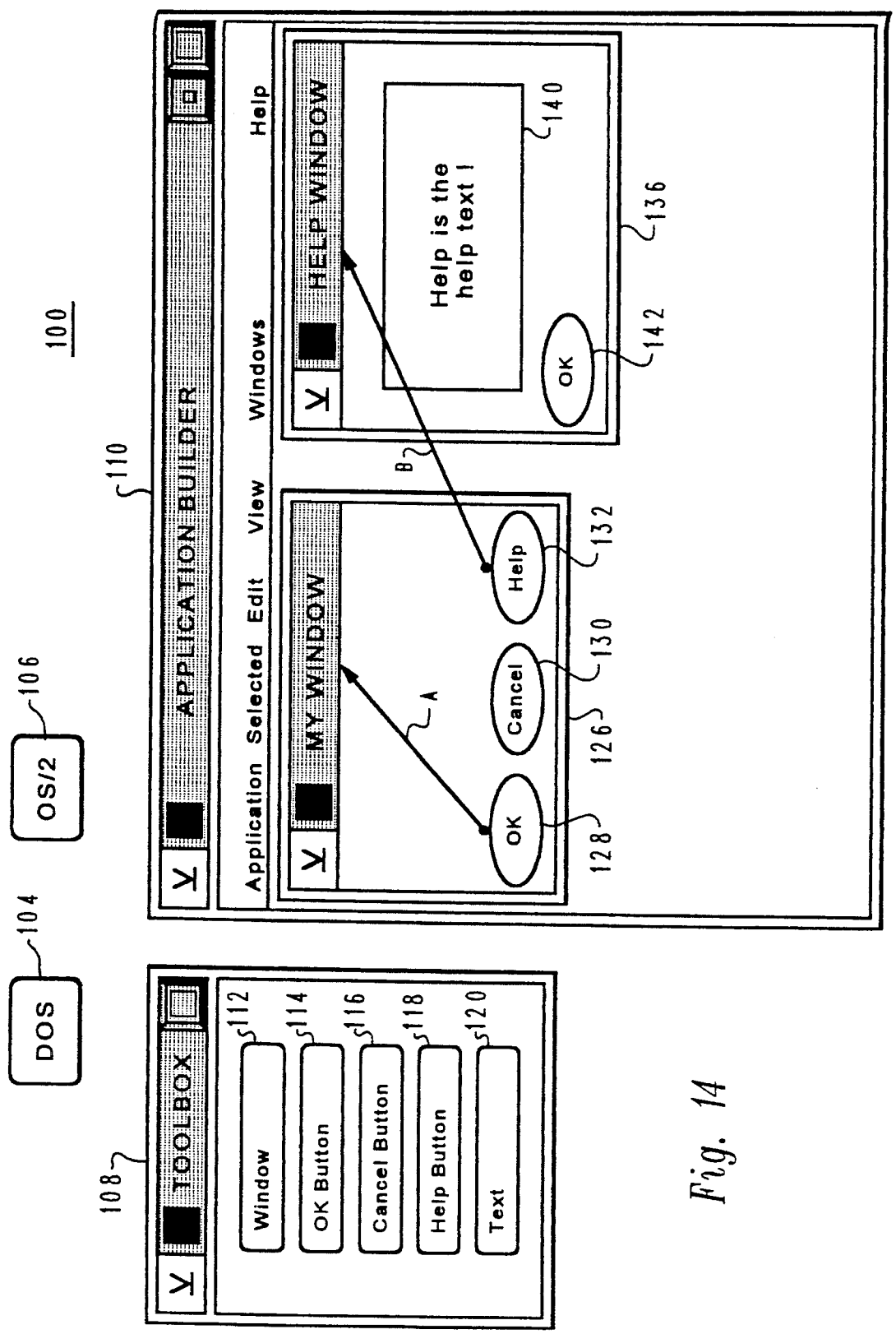
Figure 15:
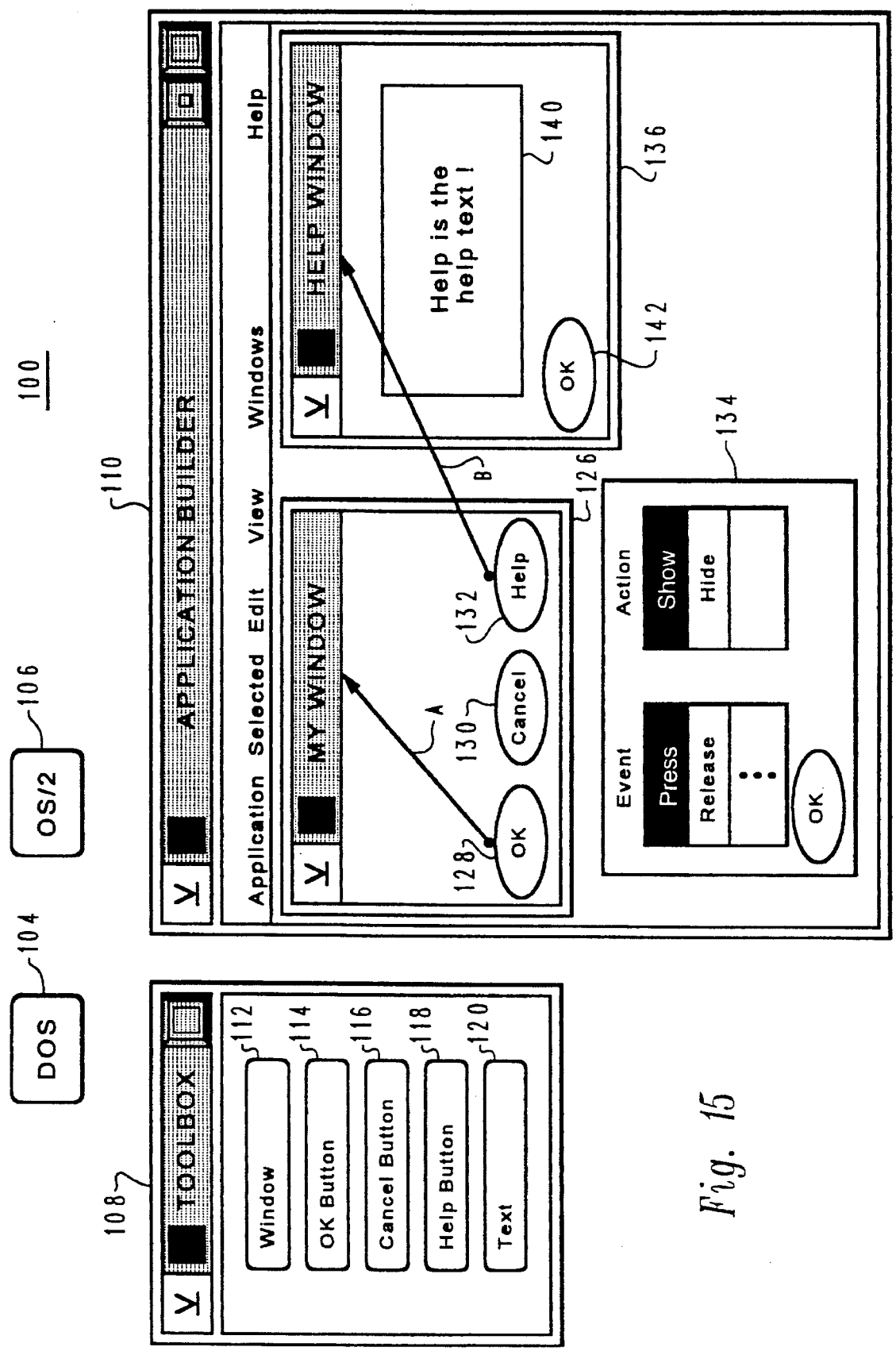

Referring next to FIG. 14, Link B is created. Link B is a link from Help button 132 in Window 126 to Window 136. Help button 132 is the source object and Window 136 is the target object. Link Manager Window 134 is utilized to define an event and an action for the objects in Link B, as illustrated in FIG. 15. In the depicted example, the event "Press" and action "Show" has been selected for Help button 132 and Window 136. Thus, pressing Help button 132 will result in Window 136 being displayed.

In accordance with a preferred embodiment of the present invention, the application builder, visually represented by Application Builder Window 110 to the user, will create and maintain an internal hierarchal tree structure that contains all objects created by the user for the application under development. The root of the tree is the application builder (graphically presented to the user as Application Builder Window 110).

Figure 16:
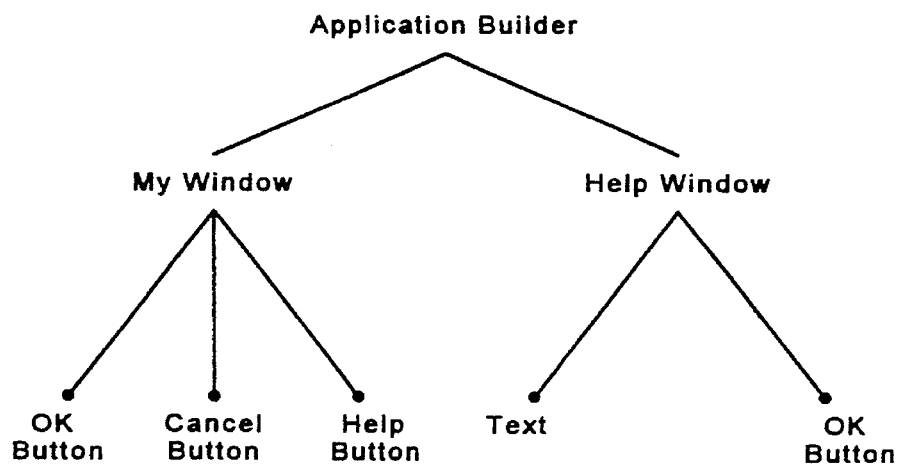
FIG. 16 is a diagram of a hierarchy tree for the application created within the application builder window as depicted in FIGS. 3–15 in accordance with a preferred embodiment of the present invention.

Referring now to FIG. 16, a diagram of a hierarchy tree for the application being created within Application Builder Window 110 is illustrated in accordance with a preferred embodiment of the present invention. Objects are nodes and the links define parent-child relationships between objects. As can be seen, Application Builder Window 110 is the root node and My Window, Window 126, and Help Window, Window 136, are the children under Application Builder Window 110. Okay button 114, Cancel button 116 and Help button 118 are children under My Window (Window 126). With respect to Help Window (Window 136), Text field 140 and Okay button 142 are children under Help Window (Window 136).

Figure 17:
FIG. 17 depicts an illustration of links created in FIGS. 3–16 in accordance with a preferred embodiment of the present invention.

With reference now to FIG. 17, a list of links A and B created in FIGS. 3–16 is depicted in accordance with a preferred embodiment of the present invention. Link A shows that Okay button 128 with "Press" event in My Window (Window 126) is linked to Window 126 with "Hide" action. Link B shows that Help button 132 with "Press" event inside Window 126 is linked to Help Window (Window 136) with "Show" action.

In accordance with a preferred embodiment of the present invention, an application builder will include a hierarchial tree structure containing all objects created. The root of the tree is the application builder itself. The present invention is implemented in an object-oriented environment in accordance with a preferred embodiment of the present invention. Those of ordinary skill in the art, however, will realize that the present invention may be implemented in other operating system environments.

Figure 18:
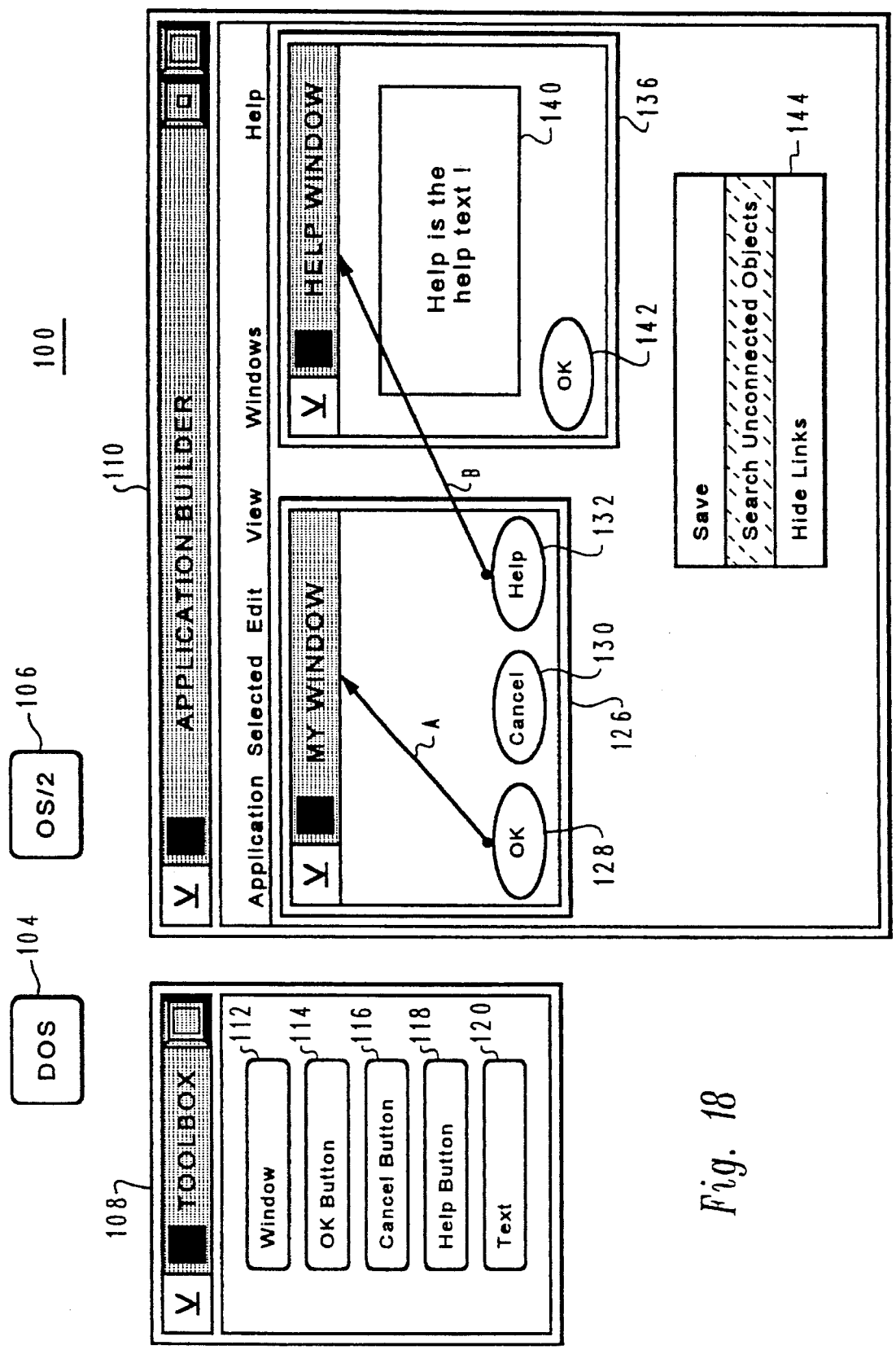
FIGS. 18–19 are illustrations depicting the process utilized to search for unconnected objects in accordance with a preferred embodiment of the present invention.

During development or after completion of an application, the user may request assistance from the application builder to detect unconnected objects in accordance with a preferred embodiment of the present invention. Referring to FIG. 18, a user may select "Search Unconnected Objects" from Pop-up Menu 144.

Figure 19:
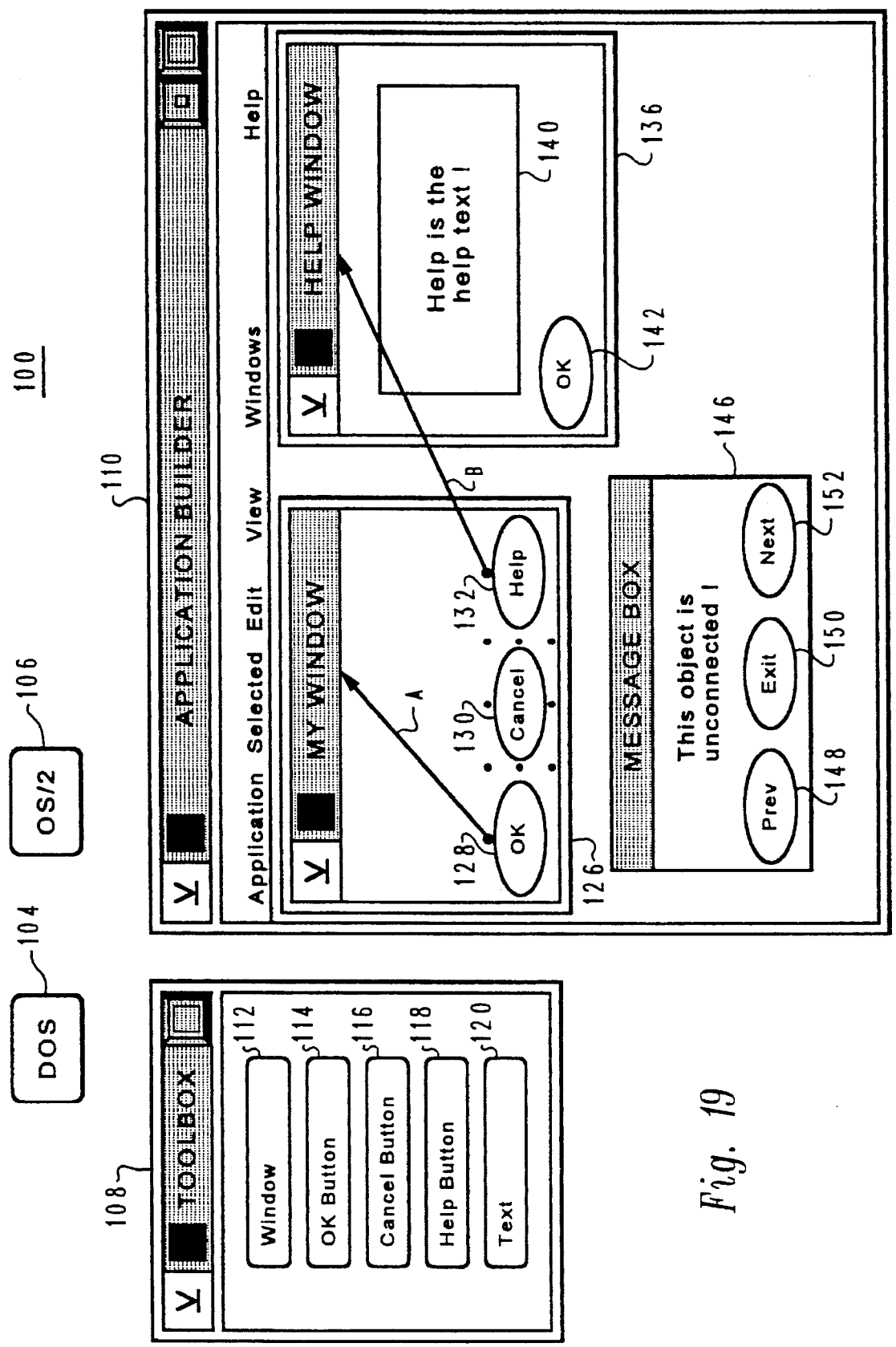

In the depicted example in FIG. 19, Cancel button 130 is highlighted to indicate that it is missing a required connection in accordance with a preferred embodiment of the present invention. In addition, a Message box 146 is displayed to the user with a message "This object is unconnected!". Also, Message Box 146 includes Prev button 148, Exit button 150, and Next button 152 to allow the user to find previously indicated unconnected objects or to find the next unconnected object. If all objects are connected, Message Box 146 will simply include a message "No Unconnected Objects". That is displayed along with an Exit button.

In accordance with a preferred embodiment of the present invention, Message Box 146 is a modeless window that allows the user to perform any other task before responding to it. Message Box 146 will remain in the display and the current unconnected object will remain highlighted until the user presses Prev button 148, Exit button 150, or Next button 152 in accordance with a preferred embodiment of the present invention. The selection of Prev button 148 results in the previously found unconnected object being highlighted. In response to a selection of the Exit button 150, the Message Box 146 is no longer displayed and the highlighting of the unconnected object is removed. The selection of Next button 152 causes the next unconnected object to be highlighted. If a previous or next unconnected object cannot be found, an error message is presented to the user and the current unconnected object remains highlighted.

Figure 20:
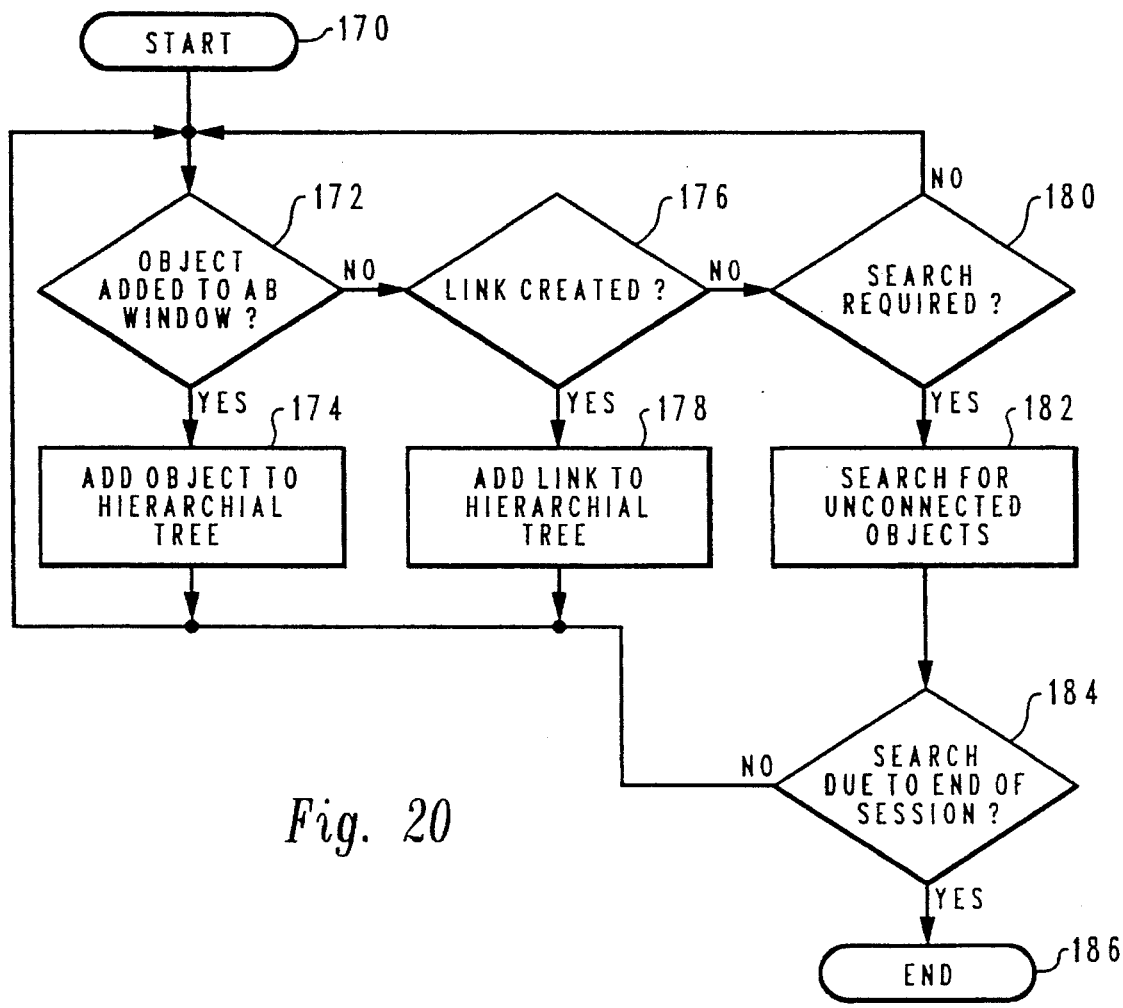
FIG. 20 depicts a high level flowchart of a method and system for detecting unconnected objects in accordance with a preferred embodiment of the present invention.

With reference to FIG. 20, a high level flowchart of a method and system for detecting unconnected objects is illustrated in accordance with a preferred embodiment of the present invention. As depicted, the process begins in Block 170 and thereafter, a determination of whether an object has been added to the Application Builder (AB) Window is made, as illustrated in Block 172. The addition of an object to the Application Builder Window results 10 in the object being added to the hierarchal tree, as depicted in Block 174.

Referring back to Block 172, if an object has not been added to the application Builder Window, a determination is made as to whether a link has been created by the user, as illustrated in Block 176. The creation of a link results in the link being added to the hierarchal tree, as depicted in Block 178.

Referring back to Block 176, if a link has not been created, the process then determines whether a search for unconnected objects is required, and illustrated in Block 180. Various events may require a search for unconnected object in accordance with a preferred embodiment of the present invention. For example, a user request for a search is one instance in which a search is required. Another instance may be if the user attempts to save the application under development and end the session. If a search is required, the process then searches for unconnected objects, as depicted in Block 182.

Thereafter, a determination of whether the search was due to the user ending the session, as illustrated in Block 184. If the search was due to the user ending the session in the Application Builder Window, the process then terminates as illustrated in Block 186. Otherwise, the process returns to Block 172. Referring again to Block 178, if none of the events in Blocks 172, 176, and 178 has occurred, the process iteratively returns to Block 172.

In response to finding an unconnected object, a user may draw any necessary links to complete the task for the unconnected object or decide to postpone this task until a later time. In either case, a user may press the Exit button 150 to terminate the searching task or press the Next button 152 to handle the next unconnected object. In addition, a user also may press the Prev button 148 to handle the previous unconnected object in the tree.

Figure 21:
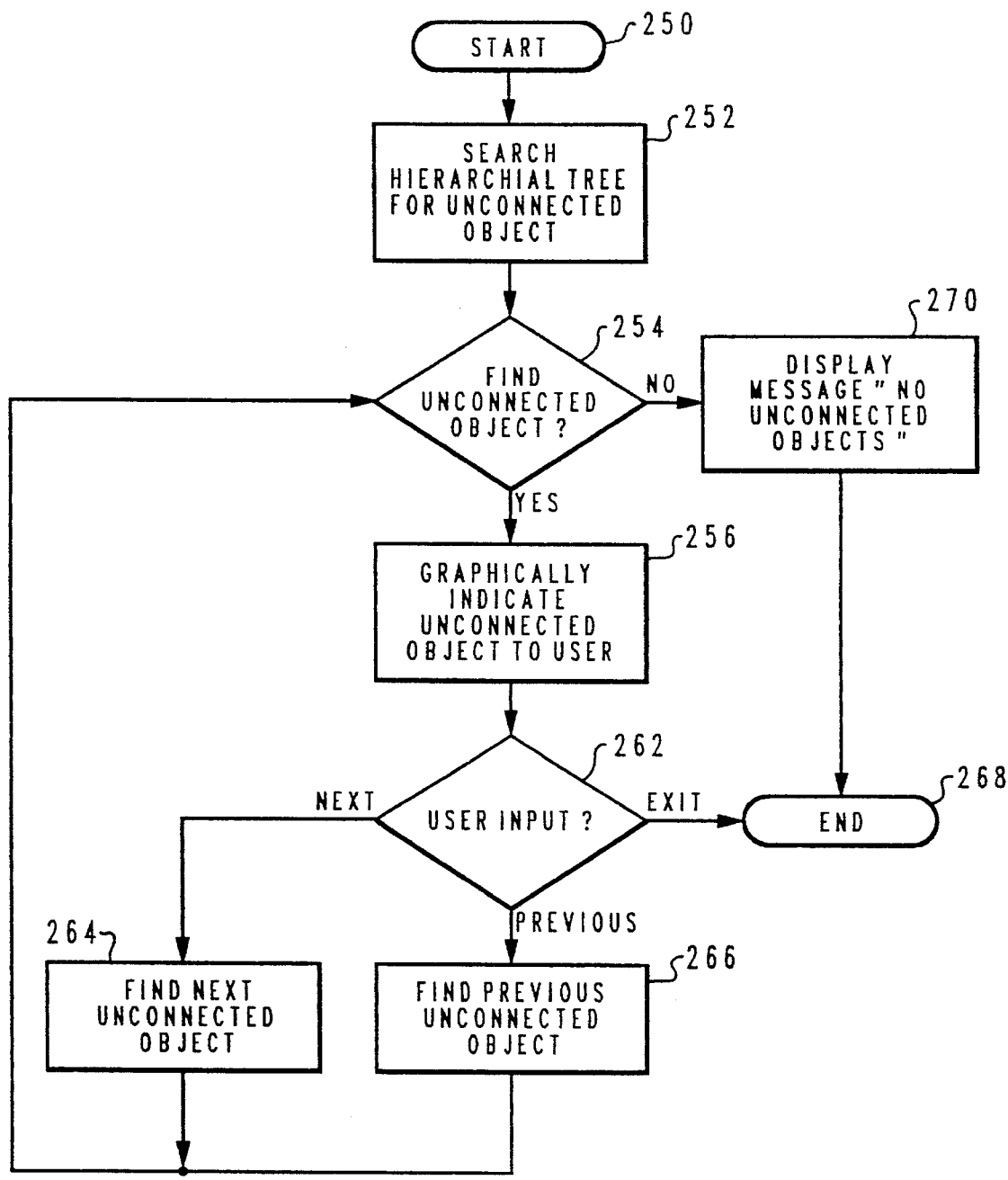
FIG. 21 is a high level flowchart of a method and system for indicating unconnected objects in accordance with a preferred embodiment of the present invention.

With reference to FIG. 21, a method and system for indicating unconnected objects to a user is illustrated in accordance with a preferred embodiment of the present invention. As depicted, the process begins in Block 250 and thereafter, a search of the hierarchal tree for an unconnected is object, depicted in Block 252. A determination of whether an unconnected object is present in the hierarchal tree is made, as illustrated in Block 254.

If an unconnected object is found, the process then graphically indicates the unconnected object to the user, as depicted in Block 256. The process indicates that unconnected object has been found by highlighting the unconnected object and by presenting a message to the user: "This object is unconnected!" in accordance with a preferred embodiment of the present invention. The process then waits for user input, as illustrated in Block 262.

Upon the reception of user input the process proceeds to find the next unconnected object, as illustrated in Block 264 in response to the user selecting the Next button. In response to the user depressing the Prev button, the process finds the previous unconnected object, as depicted in Block 266. The process returns to Block 254 from Blocks 264 and 266. If the user, selects the Exit button, the process then terminates, as depicted in Block 268.

Referring back again to Block 254, if unconnected objects are not present, the process displays a message to the user stating "No unconnected objects", as depicted in Block 270, and thereafter the process terminates, as illustrated in Block 268.

Figure 22:
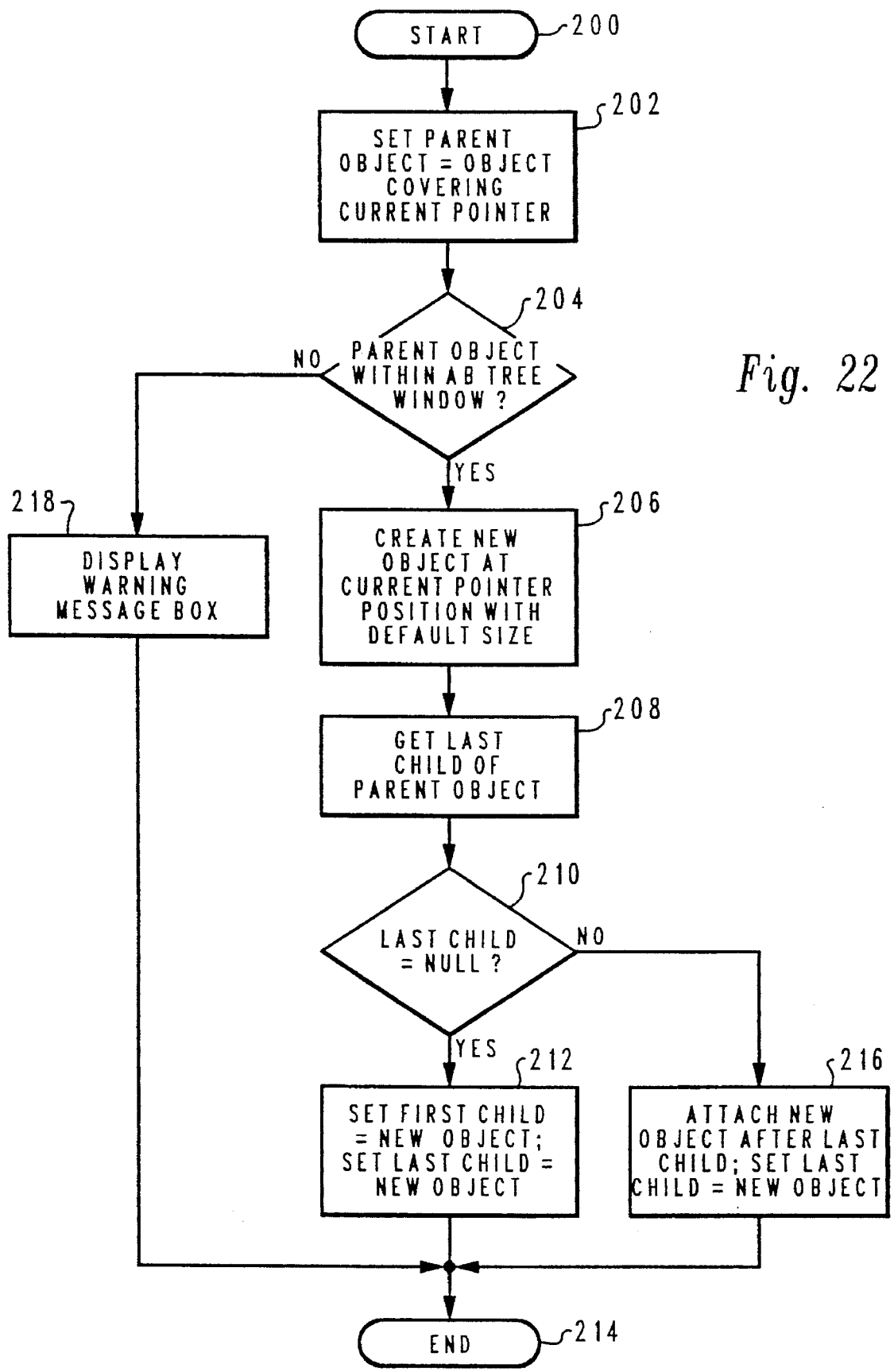
FIG. 22 depicts a flowchart of a method and system for creating an object inside another object in accordance with a preferred embodiment of the present invention.

Referring now to FIG. 22, a flowchart of a method and system for creating an object inside another object is depicted in accordance with a preferred embodiment of the present invention. As illustrated, the process begins in block 200 and thereafter, the parent object is set equal to the object covered by the pointer, as depicted in Block 202. Next, a decision of whether the parent object is within the Application Builder Window is made as illustrated in Block 204. If the parent object is within the Application Builder Window, a new object is created at the current pointer position with a default size, as depicted in Block 206.

Next, the last child of the parent object is retrieved, as illustrated in Block 208. A decision of whether the last child is equal to null is then made, as depicted in Block 210. If the last child is equal to null, then the first child is set equal to new object and the last child is also set equal to new object, as illustrated in Block 212. Thereafter, the process terminates as illustrated in Block 214. Referring again to Block 210, if the last child was not equal to null, then the process attaches a new object after the last child and sets the last child equal to new object, as illustrated in Block 216. Thereafter, the process again terminates in Block 214. Referring back to Block 204, if the parent object is not on Application Builder Window, a warning message box is displayed to the user, as depicted in Block 218.

The following is pseudo code for the process depicted in FIG. 22:

```
METHOD MOUSE_BUTTON_1_RELEASED
    SET PARENT_OBJECT=OBJECT THAT COVER
        THE CURRENT MOUSE POINTER
    IF  (PARENT_OBJECT IS ON THE TREE ROOTED
            BY THE APPLICATION BUILDER WINDOW)
    THEN
        CREATE NEW_OBJECT AT CURRENT MOUSE
            POSITION WITH DEFAULT SIZE
        GET THE LAST_CHILD OF PARENT_OBJECT

IF (LAST_CHILD=NULL) THEN
            SET FIRST_CHILD=NEW_OBJECT
            SET LAST_CHILD=NEW_OBJECT
        ELSE
            ATTACH NEW_OBJECT AFTER THE
            LAST_CHILD
            SET LAST_CHILD=NEW_OBJECT
        ENDIF
    ELSE
        DISPLAY WARNING MESSAGE BOX
    ENDIF
```

Figure 23:
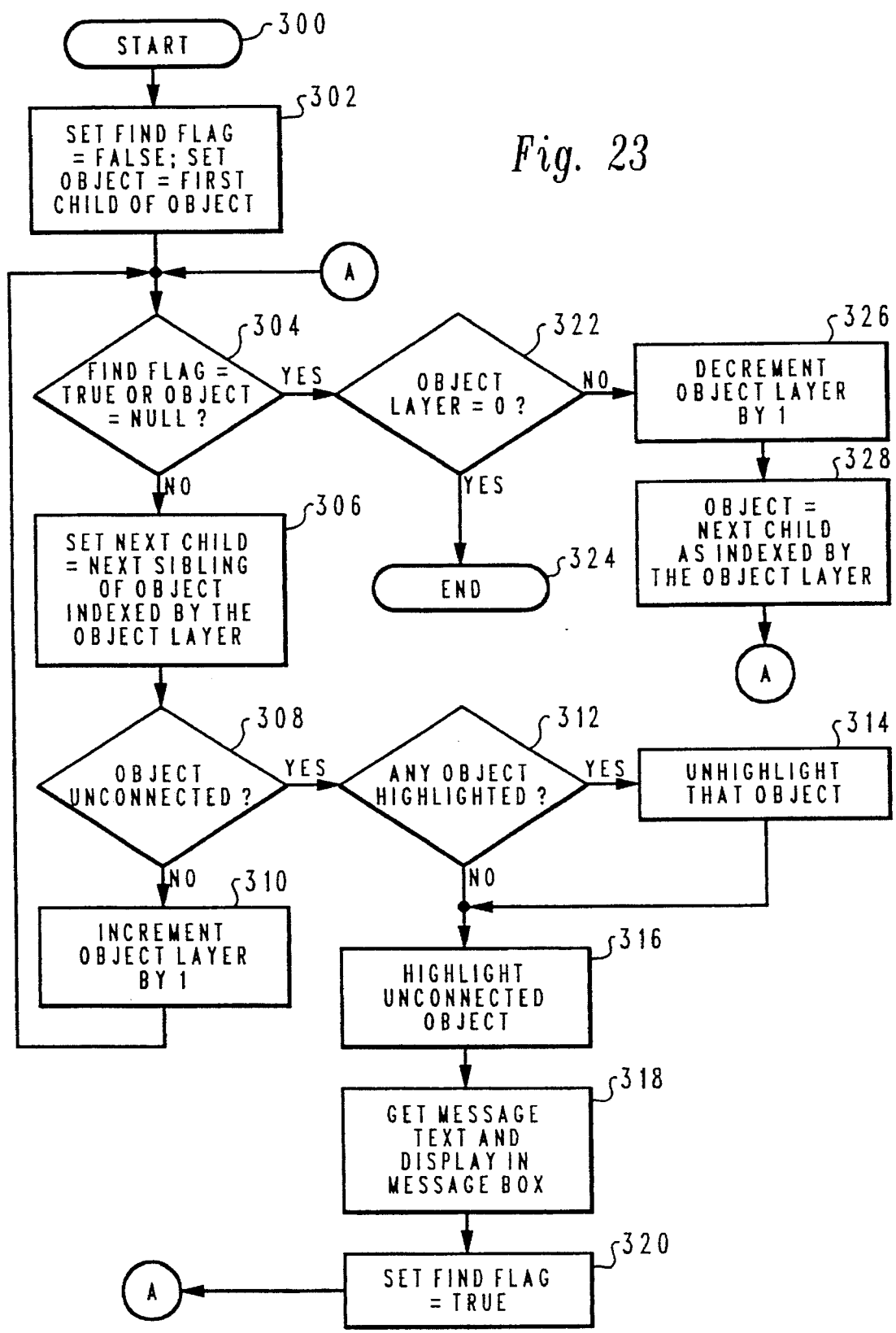
FIG. 23 is a flowchart of a method and system for searching for the next unconnected object in accordance with a preferred embodiment of the present invention.

Referring now to FIG. 23, a flowchart of a method and system for searching for the next unconnected object is illustrated in accordance with a preferred embodiment of the present invention. This process is performed in response to the depression of Next button 152 in Message Box 146, as illustrated in FIG. 19. This process also may be employed to find the first unconnected object, as depicted in block 252 in FIG. 21. As depicted, the process begins in Block 300. Thereafter, the process sets the find flag equal to false and sets the object variable equal to the first child of the object, as illustrated in Block 302. Next, the process determines whether the find flag is true or whether object is equal to null, as depicted in block 304. If neither the find flag is true or the object is null, the process then sets next child equal to next sibling of the object indexed by the object layer variable, as depicted in Block 306.

Then, a determination of whether the object is unconnected is made, as illustrated in Block 308. If the object is connected, the process increments the object layer variable by one, as depicted in Block 310. Otherwise, the process determines whether any object is highlighted, as illustrated in Block 312. If an object is highlighted, the process un-highlights that object, as depicted in Block 314. Thereafter, the unconnected object is then highlighted, as illustrated in Block 316.

Referring back to Block 312, if no objects are highlighted, the process proceeds correctly to Block 316. After highlighting the unconnected object, message text is retrieved and displayed in a message box, as depicted in Block 318. Subsequently, the find flag is set equal to true, as illustrated in Block 320. Thereafter, the process returns to Block 304.

In block 304, if either the find flag is true or the object is equal to null, the process proceeds to determine whether the object layer is equal to zero, as depicted in Block 322. If the object layer is equal to zero, the process then terminates as illustrated in Block 324. Otherwise, the object layer variable is decremented by one, as depicted in Block 326. Next, object is set equal to next child indexed by the object's layer variable, as illustrated in Block 328. Thereafter, the process returns to Block 304.

The pseudo code for searching for the next unconnected object employs a recursive process opposed to the object layer index in the depicted flowchart. Either one may be employed in accordance with a preferred embodiment of the present invention. The following is pseudo code for the process depicted in FIG. 23:

```
METHOD FIND_NEXT (OBJECT)
    SET FIND_FLAG = FALSE
    SET OBJECT = FIRST CHILD OF OBJECT
    WHILE (OBJECT ! = NULL AND FIND_FLAG =
    FALSE) DO
        SET NEXT_CHILD = NEXT SIBLING OF OBJECT
        IF (OBJECT IS UNCONNECTED) THEN
            IF (ANY OBJECT WAS HIGHLIGHTED) THEN
                DE-HIGHLIGHT THAT OBJECT
            ENDIF
            HIGHLIGHT THE OBJECT
            GET MESSAGE TEXT
            DISPLAY MESSAGE BOX
            SET FIND_FLAG = TRUE
        ELSE
            CALL FIND_NEXT (OBJECT) TO
                RECURSIVELY CHECK THE SUBTREE
            OBJECT = NEXT_CHILD
        ENDIF
    ENDWHILE
ENDMETHOD
```

Figure 24:
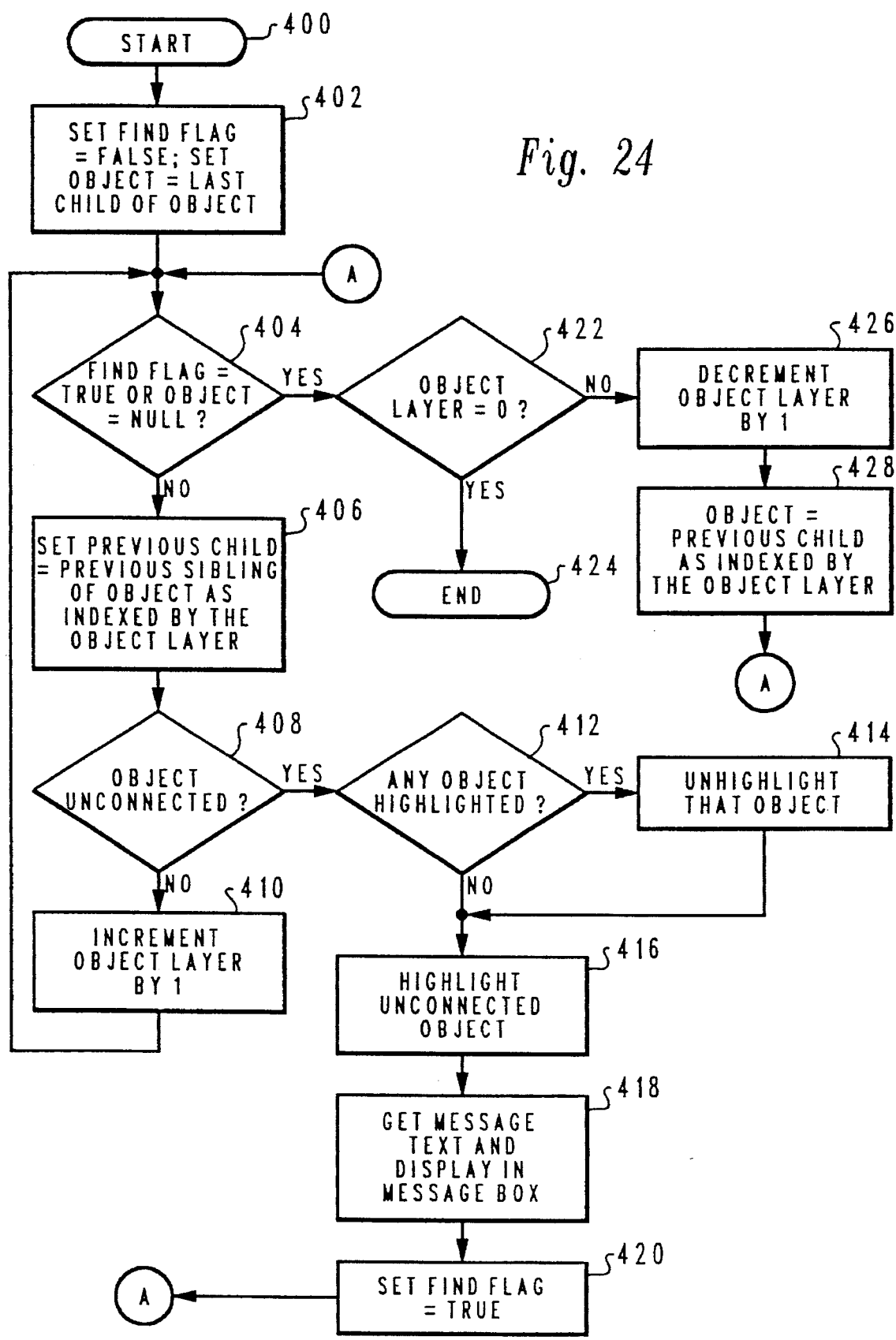
FIG. 24 depicts a flowchart of a method and system for searching for a previously unconnected object in accordance with a preferred embodiment of the present invention.

Referring now to FIG. 24, a flowchart of a method and system for searching for a previously unconnected object is depicted in accordance with a preferred embodiment of the present invention. This process is performed in response to the depression of Prev button 148 in Message Box 146 as illustrated in FIG. 19. To search for a previous unconnected object, the process begins as illustrated in Block 400 and thereafter, the find flag is set equal to false and object is set equal to last child of object as illustrated in Block 402.

Next, the process determines whether the find flag is true or if the object is null as depicted in Block 404. If neither the find flag is true or the object is null, the previous child is set equal to the previous sibling of the object as indexed by the object layer, as depicted in Block 406.

The process then determines whether the object is unconnected as illustrated in Block 408. If the object is connected, the process then increments the object layer variable by one, as depicted in Block 410. Thereafter, the process returns to Block 404.

Referring again to Block 408, if the object is unconnected, the process then proceeds to determine whether any object is currently highlighted, as illustrated in Block 412. If an object is highlighted, that object is unhighlighted, as depicted in Block 414. Next, the unconnected object is highlighted, as illustrated in Block 416. Message text is retrieved and displayed in a message box, as depicted in Block 41 8. Thereafter, the find flag is set equal to true, as illustrated in Block 420.

Then, the process returns to Block 404. If either the find flag is true or the object is null, the process then determines whether the object layer variable is equal to zero, as depicted in Block 422. If the object layer variable is equal to zero, the process then terminates as illustrated in Block 424. Otherwise, the object layer variable is decremented by one, as depicted in Block 426. Then, the object is set equal to the previous child indexed by the object layer, as illustrated in Block 428. Thereafter, the process returns to Block 404.

The pseudo code for searching for a previous unconnected object employs a recursive process opposed to the object layer index in the depicted flowcharts. Either one may be employed in accordance with a preferred embodiment of the present invention. The following is pseudo code for the process depicted in FIG. 24:

```
METHOD FIND_PREVIOUS (OBJECT)
    SET FIND_FLAG = FALSE
    SET OBJECT = LAST CHILD OF OBJECT
    WHILE (OBJECT ! = NULL AND FIND_FLAG =
    FALSE) DO
        SET PREVIOUS_CHILD = PREVIOUS SIBLING
        OF OBJECT
        IF (OBJECT IS UNCONNECTED) THEN
            IF (ANY OBJECT WAS HIGHLIGHTED) THEN
                DE-HIGHLIGHT THAT OBJECT
            ENDIF
            HIGHLIGHT THE OBJECT
            GET MESSAGE TEXT
            DISPLAY MESSAGE BOX
            SET FIND_FLAG = TRUE
        ELSE
            CALL FIND_PREVIOUS (OBJECT) TO
                   RECURSIVELY CHECK THE SUBTREE
            OBJECT = PREVIOUS CHILD
        ENDIF
    ENDWHILE
ENDMETHOD
```

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for permitting a user to efficiently create an application utilizing a plurality of objects in a graphic user interface, said method comprising:

creating a database, wherein said database is utilized to track objects selected by a user;

registering particular ones of said plurality of objects selected by a user for utilization in said application in said database;

permitting said user to create definitions for said particular ones of said plurality of objects; and graphically indicating an absence of a definition for one of said particular ones of said plurality of objects within said database, wherein said user may efficiently identify objects requiring a definition.

2. The method of claim 1, wherein said step of graphically indicating an absence is performed in response to said user attempting to terminate development of said application.

3. The method of claim 1, wherein said step of graphically indicating an absence is performed in response to said user requesting a search for an absence of a definition.

4. The method of claim 1, wherein said steps of creating, registering, permitting and graphically indicating are performed in an object-oriented environment.

5. A data processing system for permitting a user to efficiently create an application utilizing a plurality of objects in a graphic user interface, said data processing system comprising:

creation means for creating a database, wherein said database is utilized to track objects selected by a user;

registration means for registering particular ones of said plurality of objects selected by a user for utilization in said application in said database;

means for permitting said user to create definitions for said particular ones of said plurality of objects; and indication means for graphically indicating an absence of a definition for one of said particular ones of said plurality of objects within said database, wherein said user may efficiently identify objects requiring a definition.

6. The data processing system of claim 5, wherein said indication means is responsive to said user attempting to terminate development of said application.

7. The data processing system of claim 5, wherein said indication means is responsive to said user requesting a search for an absence of a definition.

8. The data processing system of claim 5, wherein said database has a hierarchial tree structure.

9. The data processing system of claim 8, wherein said hierarchial tree structure includes a plurality of nodes and links connecting nodes and wherein an object is a node and a link is an association between two objects.

10. The data processing system of claim 9, wherein said link defines a parent-child relationship between two objects.

11. The data processing system of claim 5, wherein said registration means includes storing a connection between two objects in said database.

12. A computer program product for permitting a user to efficiently create an application utilizing a plurality of objects in a graphic user interface, said computer program product comprising:

instruction means for creating a database, wherein said database is utilized to track objects selected by a user;

instruction means for registering particular ones of said plurality of objects selected by a user for utilization in said application in said database;

instruction means for permitting said user to create definitions for said particular ones of said plurality of objects; and instruction means for graphically indicating an absence of a definition for one of said particular ones of said plurality of objects within said database, wherein said user may efficiently identify objects requiring a definition.

13. A data processing system for permitting a user to efficiently create an application in a graphic user interface, said data processing system comprising:

a display;

a processor;

processor means for creating a database including data for objects selected by a user;

processor means for creating a plurality of objects for utilization in an application;

processor means for registering particular ones of said plurality of objects selected by a user for utilization in said application in said database;

processor manipulation means, responsive to user input, for adding an object to said application and for defining an undefined object; and processor search means for automatically searching said database in response to a request to detect a presence of an undefined object; and processor indication means, responsive to a presence of an undefined object detected by said search means, for indicating said presence of an undefined object to said user on said display.

14. The data processing system of claim 13, wherein said processor indication means is responsive to said user attempting to terminate development of said application.

15. The data processing system of claim 13, wherein said processor indication means is responsive to said user requesting a search for an absence of a definition.

16. The data processing system of 13, wherein said database has a hierarchial tree structure.

17. The data processing system of claim 16, wherein said hierarchial tree structure includes a plurality of nodes and links connecting nodes and wherein an object is a node and a link is a connection between two objects.

18. The data processing system of claim 13, wherein said processor registration means includes storing a connection between two objects in said database.

19. The data processing system of claim 13, wherein an undefined object is an object requiring a connection to another object.

20. The data processing system of claim 13, wherein said plurality of objects are graphically presented to a user on said display screen.

21. The data processing system of claim 20, wherein said processor indication means indicates said presence of an undefined object to said user on said display by presenting said undefined object in a list.

22. The data processing system of claim 20, wherein said processor indication means indicates said presence of an undefined object to said user on said display by highlighting said undefined object.

* * * * *

UNITED STATES PATENT AND TRADEMARK OFFICE
CERTIFICATE OF CORRECTION

PATENT NO. : 5,557,731
DATED : September 17, 1996
INVENTOR(S) : Li et al.

It is certified that error appears in the above-indentified patent and that said Letters Patent is hereby corrected as shown below:

Column 6, line 11: delete "10" after "results".

Signed and Sealed this

Fourth Day of February, 1997

*Attest:*

BRUCE LEHMAN

*Attesting Officer*     *Commissioner of Patents and Trademarks*